(12) United States Patent
Liu et al.

(10) Patent No.: US 8,999,441 B2
(45) Date of Patent: Apr. 7, 2015

(54) METHOD FOR FABRICATING COILED NANO CARBON MATERIAL, COILED NANO CARBON LAYERED SUBSTRATE AND COILED NANO CARBON MATERIAL THEREOF

(71) Applicant: National Defense University, Bade (TW)

(72) Inventors: Yih-Ming Liu, Zhongli (TW); Ming-Der Ger, Bade (TW); Nen-Wen Pu, Taoyuan County (TW); Kun-Ju Chung, Pingtung County (TW); Ming-Hsien Lin, Taoyuan County (TW)

(73) Assignee: National Defense University, Bade, Taoyuan County (TW)

( * ) Notice: Subject to any disclaimer, the term of this patent is extended or adjusted under 35 U.S.C. 154(b) by 39 days.

(21) Appl. No.: 13/846,272

(22) Filed: Mar. 18, 2013

(65) Prior Publication Data
US 2014/0057097 A1    Feb. 27, 2014

(30) Foreign Application Priority Data

Aug. 22, 2012   (TW) .............................. 101130501 A

(51) Int. Cl.
  *C01B 31/02*  (2006.01)
  *C01B 31/00*  (2006.01)
(52) U.S. Cl.
  CPC .............. *C01B 31/0293* (2013.01); *C01B 31/00* (2013.01); *Y10T 428/25* (2013.01)
(58) Field of Classification Search
  None
  See application file for complete search history.

(56) References Cited

U.S. PATENT DOCUMENTS

| 7,074,380 | B2 | 7/2006 | Iwaki et al. | |
| 7,276,843 | B2 | 10/2007 | Sasaguri | |
| 7,585,199 | B2 | 9/2009 | Takai | |
| 7,923,058 | B2 | 4/2011 | Iwaki et al. | |
| 2003/0001477 | A1 | 1/2003 | Sasaguri | |
| 2003/0109382 | A1* | 6/2003 | Nakayama et al. | 502/336 |
| 2004/0060477 | A1* | 4/2004 | Iwaki et al. | 106/472 |

(Continued)

FOREIGN PATENT DOCUMENTS

| EP | 1061041 A1 | 12/2000 |
| JP | 2002293520 A | 10/2002 |

(Continued)

OTHER PUBLICATIONS

Shaikjee, Ahmed et al., The synthesis, properties and uses of carbon materials with helical morphology, Journal of Advanced Research, (2012), pp. 195-223.

(Continued)

*Primary Examiner* — Joseph Miller, Jr.
(74) *Attorney, Agent, or Firm* — Muncy, Geissler, Olds & Lowe, P.C.

(57) ABSTRACT

A preparing method for coiled nano carbon material is provided and includes forming a noble metal catalyst crystallite nucleus layer on the surface of the substrate by displacement of a noble metal catalyst, forming a composited nano carbon material on the metal layer of the substrate by using TCVD; in which the composited nano carbon material includes coiled carbon nano tubes and coiled carbon nano fiber. The measured quantity of the total coiled nano carbon tubes and coiled nano carbon fiber in the total measured quantity of nano carbon material is greater than 30%. The coiled nano carbon material can be acquired by scraping it off from the substrate surface.

8 Claims, 23 Drawing Sheets

(56) References Cited

U.S. PATENT DOCUMENTS

| | | |
|---|---|---|
| 2005/0275329 A1 | 12/2005 | Hiraki et al. |
| 2010/0261058 A1 | 10/2010 | Lopatin et al. |
| 2010/0295635 A1* | 11/2010 | Schubert et al. .............. 333/235 |
| 2011/0183105 A1 | 7/2011 | Gamo et al. |

FOREIGN PATENT DOCUMENTS

| | | |
|---|---|---|
| TW | I324616 B | 5/2010 |
| WO | WO-2004105940 A1 | 12/2004 |
| WO | WO-2012038786 A1 | 3/2012 |

OTHER PUBLICATIONS

Sung, Woo Yong et al., Synthesis and field emission characteristics of carbon nanocoils with a high aspect ratio supported by copper microtips, IOP Publishing, (2007), pp. 1-6.

Saito, Yahachi et al., High yield of single-wall carbon nanotubes by arc discharge using Rh—Pt mixed catalysts, Chemical Physics Letters, (1998), pp. 593-598.

Liu, Yih-Ming et al., Low temperature fabrication of Ni—P metallic patterns on ITO substrates utilizing inkjet printing, Microelectronics Reliability, (2012) pp. 398-404.

Bonard, Jean-Marc et al., Field emission from cylindrical carbon nanotube cathodes: Possibilities for luminescent tubes, Applied Physics Letters, (2001) pp. 2775-2777.

Ding, D.Y. et al., Ni—Ni3p alloy catalyst for carbon nanostructures, Chemical Physics Letters, (2003) pp. 33-336.

Bonard, J.-M et al., Field emission properties of carbon nanohorn films, Journal of Applied Physics, (2002) pp. 10107-10109.

Pan, Lujun et al., Fabrication of Carbon Nanocoil Field Emitters and Their Application to Display, J. Soc. Photogr. Sci. Technol. Japan, (2002) pp. 369-372.

* cited by examiner

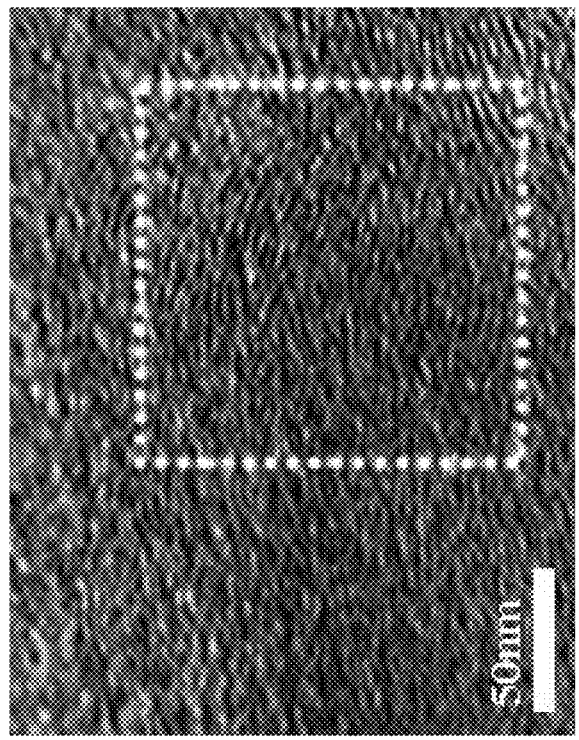
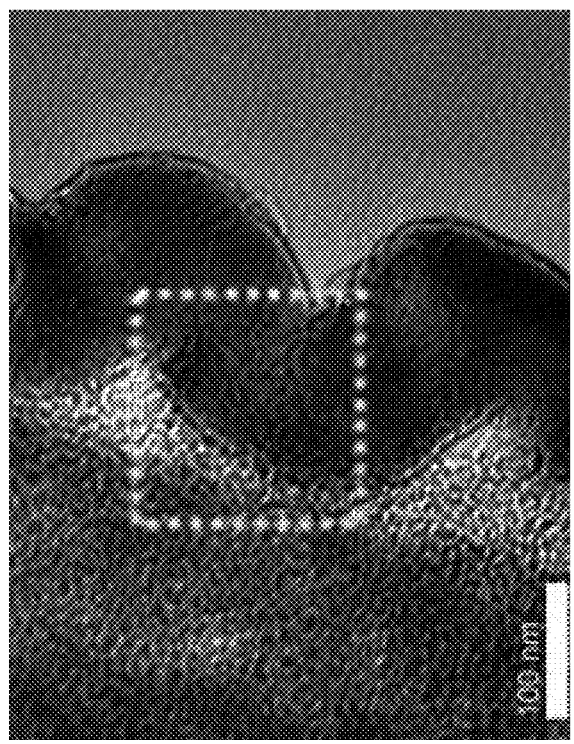
FIG. 10

METHOD FOR FABRICATING COILED NANO CARBON MATERIAL, COILED NANO CARBON LAYERED SUBSTRATE AND COILED NANO CARBON MATERIAL THEREOF

CROSS-REFERENCE TO RELATED APPLICATION

This application claims the benefit of Taiwan Patent Application No. 101130501, filed on Aug. 22, 2012, in the Taiwan Intellectual Property Office, the disclosure of which is incorporated herein in its entirety by reference.

FIELD OF THE INVENTION

The present invention relates to a preparing method for coiled nano carbon material, a substrate with coiled nano carbon layer and a coiled nano carbon material thereof, and more particularly to a method for growing a coiled nano carbon material with high purity by utilizing a noble metal catalyst crystalline nucleus and a thermal chemical vapor deposition (TCVD) process.

BACKGROUND OF THE INVENTION

Generally, carbon nano materials include various nanoscale carbon structures, such as hollow tubular-like carbon nano tube (CNT), solid fiber-like carbon nano fiber (CNF), nanoscale-thickness single/multiple layered graphite sheet, globular fullerene, atomic-thickness graphene, carbon nanohorn, carbon nano-filament wall, crystallized carbon microsphere, amorphous carbon microsphere, and so on. In detail, the structures as well as configurations of carbon nano tube or the carbon nano fiber can be chained or coiled, such as carbon nano-coil tube (coiled shape CNT, coil-CNT) or coiled nano carbon fiber (coiled shape CNF, coiled nano carbon fiber). The aforementioned nanoscale carbon structures are shown in FIG. 1, which is quoted from Ahmed Shaikjee, Neil J. Coville., "The synthesis, properties and uses of carbon materials with helical morphology" Journal of Advanced Research, Cairo, 2011). In the past, the coiled shape CNT and the coiled nano carbon fiber are by-products from the CNT fabrication process. Later on, in 1989, Motojima et al. used acetylene gas as a carbon source gas to grow micro coiled carbon fibers (MCCF) by utilizing the catalyzed thermal chemical vapor deposition method.

Carbon nanocoil (coiled shape CNC) and carbon microcoil (CMC) have a unique coiled structure (see FIG. 3), a great mechanical strength, structural elasticity, and electrical characteristics, so that numerous of researchers had laid stress on them since then. More specifically, carbon nanocoil and carbon microcoil can be widely applied to various fields like electromagnetic wave absorber, sensors of magnetic field induced current, and nanoscaled mechanical components, etc.

While applying carbon nanotube to the field emission, hundred to thousand times of locally enhanced electric field can be generated at the tip of carbon nanotube due to its large depth-to-width ratio and its small diameter. As a result, carbon nanotube (CNT) or carbon nanofiber (CNF) has great electron emission properties; the work function of about 4.5 eV can be overcome, and electrons can be emitted around 1~2 V/µm. For example, while depositing CNT or CNF on the cathode of an electric field, the electrons can be emitted from the tip or the outer surface of CNT or CNF driven by the driving force of the electric field. Then, those electrons will be collided with the phosphor layer on the anode through a vacuumed interval, thereby a light beam is emitted from the phosphor layer based on the field emission light theory. The field emission light theory is applied for developing field emission light (FEL), and field emission display (FED). For instance, in 2002, J.-M. Bonard, R. Gaal, S. Garaj et al. had published a paper (Field emission properties of carbon nano-horn films. Journal of applied physics 91 (12): 10107-10109) which illustrates that carbon nanostructure, multi/single-wall carbon nano-tube, and carbon nano-cone have great field emission properties. In addition, US Pub. No. 20030001477, U.S. Pat. No. 7,276,843, and a paper published by Pan L, Hayashida T, Nakayama Y et al. in 2002 (Fabrication of Carbon Nanocoil Field-Emitters and Their Application to Display; Japan Hardcopy Vol 2002, page 533-534) also illustrate that single-wall carbon nano-tube, cylindrical graphene, graphitic nanofibers, carbon nano-coil fiber can be used as a cathode emitter.

Coil shape CNT and coil-CNF have excellent electromagnetic-wave absorption efficiency, such an absorption efficiency of electromagnetic waves ranging from 250 to 950 MHz is about to be 90 to 95%. For instance, while mixing 1 to 2 wt % coil shape CNT into a polyurethane matrix, the electromagnetic wave absorption efficiency of the mixture even reaches −20 db, that is, an absorption efficiency over 99%. Carbon nanocoil (coil shape CNC) as well as carbon microcoil (CMC) also have good electromagnetic-wave absorption efficiency in gigahertz region (12~110 GHz); in detail, electromagnetic-wave absorption efficiency may be enhanced by multi-layered absorbing composites with additive the coil shape CNC and/or CMC. Additionally, other outstanding properties of coil shape CNC such as its mechanical properties and hydrogen absorption properties have been taken seriously as well.

As for the aspect of fabrication processes for coil-CNT and coil-CNF, European Pat. No. 1061041 has disclosed that, by using the chemical vapor deposition (CVD) method, coil shape CNT can be grown on a glass plate, a silicon plate, and an alumina plate by utilizing cobalt, nickel, iron, chromium or palladium. In 2007, Woo Yong Sung et al. Nanotechnology 18 245603) have illustrated that coil-CNF mixed with coil shape CNT can be grown on a conductive film layer of a nickel substrate. However, the yield of CNF (or coil-CNF) by using these disclosures process is very low, not ready for practical application in industrial.

Generally, in order to reduce the energy barrier during the growth of CNT and coil shape CNC, metal catalysts are commonly used. For example, in 1998, Saito et al. published a paper titled "High yield of single-wall carbon nanotubes by arc discharge using Rh—Pt mixed catalysts" (Chemical Physics Letters 294 (1998), Pages 593-598), which utilizes rhodium or platinum as a catalyst, and US Pub. No. 20100261058 has utilized magnesium, gold, silver, ruthenium, rhodium, iridium, platinum, palladium, molybdenum, tungsten, and chrome catalysts for adhering CNT. Further, US Pub. No. 20110183105 has disclosed carbon nano materials containing coiled nano carbon material grown on oxides of cobalt, nickel, iron, and palladium. U.S. Pat. Nos. 7,074,380 and 7,923,058 have disclosed coiled nano carbon materials grown on an electrode by using thermal decomposition method with organic compound catalyst solutions containing cobalt, nickel, iron, or palladium ions. It is known from WO2004105940 that carbon nano-coil tubes may be effectively fabricated by using catalysts including carbides of transition metals, in which the transition metals is preferably iron, cobalt, or nickel, such as $Fe_3InC_{0.5}$, $Fe_3InC_{0.5}Sn_w$, and $Fe_3SnC$. It is also known from WO2012038786 that, catalysts including Ni, Ru, Rh, Pd, Ir, Pt, Cr, Mo, or W; or organic acids with more than one coordination group, steroids, amino acids, peptides, phosphate, nucleotides, tetrapyrrols, ferrioxamine; ionophores such as gramicidin, monensin, valinomycin, and phenolics, 2,2'-bipyridyldimercaptopropanol, ethylenedioxydiethylene-dinitrilo-tetraacetic acid, ethylene glycol-bis(2-aminoethyl)-N,N,N',N"-tetraacetic acid, ionophoresnitrilotrriacetic acid, salicylic acid, triethanolamine, sodium succinate, sodium acetic acid, ethylene diamine, ethylenediaminetetraacetic acid, ethylenetriaminepentaacetic acid, and ethylenedinitrilotetraatic acid, are disclosed. In WO2012038786, coil-CNF and coil shape CNC having 20 nm~200 nm in width and 0.5 μm~10 μm in length can be grown on a glass fiber by immersing a glass substrate with such catalysts followed by introducing into a carbon source of $CH_4$, $C_2H_6$, $C_3H_8$, $CO_2$, ethylene, acetylene, etc.

Furthermore, Ding et al. have published a paper in 2003, "Ni—$Ni_3P$ Alloy Catalyst for Carbon Nanostructures, Chemical Physics Letters, Vol. 371, pp. 333-336" illustrating that by adding a few phosphorous and sulfur, decomposition of hydrocarbon molecules can be facilitated, and thus enhancing the yield of coil-CNT. However, in practice, the fractional yield and purity of coil-CNF and coil-CNT fabricated by using those aforementioned processes and techniques are low that is insufficient for practical application, such as using in electric field emission or the microwave absorption.

SUMMARY OF THE INVENTION

An aspect of the present disclosure is to provide a preparing method for coiled nano carbon material; referring to FIG. 2. The method comprises the following steps. A step of providing a substrate and cleaning the surface of the substrate is provided; in which the substrate can be made of silicon materials (e.g. single crystal silicon, polycrystalline silicon, silicon doped with metal), glass, alumina ceramic, metal, and any medium be electroplated with indium tin oxide material, or combinations thereof.

A step of immersing the substrate in a noble metal catalyst solution which contains a noble metal catalyst for forming a noble metal catalyst crystallite nucleus layer on the surface of the substrate; in which the noble metal catalyst is selected from the group consisting of a first catalyst group, a second catalyst group, and combinations thereof; in which the first catalyst group is selected from an organic chelate compounded of platinum, palladium, rhodium, chrome, ruthenium, osmium, or iridium, and mixtures thereof, whereas the second catalyst group is selected from an solution of chloride, sulfate, acetate, and mixtures compounded of platinum, palladium, rhodium, chrome, ruthenium, osmium, iridium, and mixtures thereof.

The aforementioned organic chelate can be "A" (copolymer of styrene monomer and N-isopropylacrylamide monomer (Poly(Styrenea-Co-NIPAAmb)), "B" (copolymer of styrene monomer and polyester oligomer), "C" (copolymer of styrene monomer and methyl methacrylate (PS-co-PMMA [poly(styrene-co-methyl methacrylate)])), "D" (ethylene vinyl acetate copolymer), "E" (copolymer of polyvinyl acetate and chitosan (poly(vinyl acetate) chitosan (CS)-graft-poly(vinyl acetate)), or combinations thereof.

In order to perform a preferable efficiency of growth, when the material of the substrate is made of silicon, glass, alumina ceramic, a medium be electroplated with indium tin oxide, metal, or combinations thereof, the noble metal catalyst is preferred to be selected from the first catalyst group; when the substrate is made of iron-nickel alloy, iron-cobalt-nickel alloy, nickel, nickel-copper, copper, copper alloy, nickel electroplated silicon, nickel-doped silicon, nickel electroplated glass, nickel-doped glass, nickel electroplated alumina ceramic, nickel doped alumina a ceramic, and combinations thereof, the noble metal catalyst is preferred to be selected from the second catalyst group, alternatively, the second catalyst group can be selected and used prior to the first catalyst group.

A step of drying the substrate formed with the noble metal catalyst crystallite nucleus layer is optionally provided, in which the drying temperature can be, usually, ranged from room temperature to 150° C.; furthermore, other drying processes can be selected also, such as nitrogen drying, etc.

Next, the substrate having the noble metal catalyst crystallite nucleus layer formed thereon can be disposed in a vacuum chamber following by a thermal chemical vapor deposition (TCVD) process which includes, performing a vacuumed environment with an initial vacuum preferably higher than a degree of vacuum of 0.1 torr for degassing, then introducing a mixture of a carbon source gas and an inert gas into the chamber, in which the carbon source gas can be a hydrocarbon gas, more preferably, without oxygen, such as acetylene gas, methane gas or a mixture thereof; the inert gas can be hydrogen, argon, helium, or mixtures thereof.

The vacuum chamber is then heated to a predetermined growth temperature Tk; while the first catalyst group is selected and used, the predetermined growth temperature (Tk) is ranged from 500° C. to 900° C.; while the second catalyst group is exclusively selected and used, the predetermined growth temperature (Tk) is ranged from 550° C. to 900° C.

After growing with a predetermined growing time (for example, 5 min to 60 min), a composited nano carbon material layer can be grown on the substrate. After cooling, a coiled nano carbon layered substrate having the composited nano carbon material layer can be taken out of the vacuum chamber; a coiled nano carbon material can then be obtained by scraping the composited nano carbon material layer off the coiled nano carbon layered substrate.

Among various carbon nano structures, their electric field emission efficiency can be enhanced, and their work life can be extended as well by using amorphous carbon nanotubes, or growing amorphous carbon nanoparticles or amorphous carbon fibers on carbon nanotubes, which have been disclosed in JP2002293520, U.S. Pat. No. 7,585,199 and US20050275329, respectively. In contrast, by using the method of the present disclosure, which is provided for fabricating coiled nano carbon material, not only increasing the purity of the coiled carbon nano tube but also the amorphous matrix of the coiled nano carbon fiber has crystallized carbon nanoparticles, which is fabricated using the method of the present disclosure, contains an amount of crystallized carbon nanoparticles, thereby enhancing the field emission effect by providing more electric emission spots in application to field emission.

The composited nano carbon material layer of FIG. 3 is a mixture of coiled nano carbon material and other kinds of nano carbon materials, such as linear carbon nano tube, linear carbon nano fiber, and a small quantity of graphite, graphene, or other forms of graphite. In this invention, the coiled nano carbon material is a mixture of coil-CNT and coiled nano carbon fiber, the coil-CNT is coil-shaped carbon nano tube, and the coiled carbon nano fiber is coil-shaped carbon nano fiber. The amorphous matrix of the coiled carbon nano fiber contains crystallized carbon nanoparticles.

Composited nano carbon material with high purity can be fabricated by using the aforementioned method using the first catalyst group. The measured quantity of the coiled nano carbon material (the total of coil-CNT and coil carbon fiber) of the composited nano carbon material layer in a total measured quantity of the composited nano carbon material is, in average, at least 30%; that is, the average measured quantity in the composited nano carbon material layer satisfies:

$$\frac{C_{Coil\text{-}CNT} + C_{coil\text{-}CNF}}{C_T} \geq 30\%.$$

Where $C_{coil\text{-}CNT}$ is the measured quantity of coil-CNT, $C_{coil\text{-}CNF}$ is the measured quantity of coiled nano carbon fiber, $C_T$ is the total measured quantity of nano carbon material. Wherein the measured quantity is the total quantity of nano carbon material of the composited nano carbon material layer counted by using a scanning electron microscope; SEM.

While the composited nano carbon material with high purity is fabricated by applying the aforementioned method using the second catalyst group (or even using the organic chelate of the first catalyst group) to a metal substrate (or a non-metal substrate with electroless plating), the measured quantity of the coiled nano carbon material of the composited nano carbon material layer in the total composited nano carbon material is, in average, at least 50%; that is, the measured quantity of the composited nano carbon material layer satisfies:

$$\frac{C_{Coil\text{-}CNT} + C_{coil\text{-}CNF}}{C_T} \geq 50\%.$$

Then, an aging process can be performed and included: disposing the substrate having the composited nano carbon material layer in an atmosphere chamber, and heating the atmosphere chamber with introducing an inert gas to an aging temperature Tc in order to proceed on an aging step; unstable nano carbon materials may be removed during this process, such that the measured quantity of the coiled nano carbon material of the composited nano carbon material layer can be increased, in average, 3~10%, this ratio can be increased more significantly by using different conditions. The aforementioned aging temperature, Tc, is higher than 200° C., and an aging period can be adjusted to be shorter by using a higher temperature. The aging temperature can be 200° C.≤Tc≤500° C.

That is, while only using the first catalyst group to grow the coiled nano carbon material of the composited nano carbon material layer on a substrate (the total coil-CNT and coiled nano carbon fiber), the measured quantity thereof in the total measured quantity of the composited nano carbon material is, in average, at least 33%; whereas by using the second catalyst group (or even using the organic chelate of the first catalyst group), the measured quantity of the coiled nano carbon material of the composited nano carbon material layer in the total measured quantity of the composited nano carbon material is, in average, at least 55%.

A substrate with coiled nano carbon layer can be fabricated by using the preparing method for coiled nano carbon material of the present disclosure, and the measured quantity of coiled nano carbon material thereof in the total measured quantity of nano carbon material is greater than or equal to 30%; ratios of the measured quantities differs and depends on the selected organic metal catalyst, the initial vacuum, the predetermined growth temperature, and the predetermined growing time; in other embodiments, the ratio of the measured quantity of the coiled nano carbon material can be greater than or equal to 80%. When compared with other carbon nano tubes or other nano carbon materials, coiled nano carbon material has better field emission characteristics, such as better field emission spots uniformity, better luminance uniformity, and longer working life, so that coiled nano carbon material can be applied as a cathode emission source of field emission. As well as, coiled nano carbon material has good wave absorption characteristics in Gigahertz region, 12~110 GHz, when mixing polymer materials with coiled nano carbon material, the wave absorption efficiency can even reach −20 dB (an absorption efficiency greater than 99%), so that the coiled nano carbon material can also be applied to wave-absorbing materials, electromagnetic protection, or nano-micro-antenna.

Another aspect of the present disclosure is to provide a coiled nano carbon layered substrate (see FIG. 4), which comprises a substrate, a noble metal catalyst crystallite nucleus layer, and a composited nano carbon material, in which the noble metal catalyst crystallite nucleus layer is selected from the noble metal catalyst consisting of platinum, palladium, rhodium, chrome, ruthenium, osmium, iridium, and mixtures thereof, and the material of the substrate is selected from the group consisting of silicon, glass, alumina ceramic, metal, and the combinations thereof; by using the aforementioned method, the composited nano carbon material layer can be formed on the substrate.

The composited nano carbon material layer contains coiled nano carbon material, and the coiled nano carbon material is the mixture of soiled-CNT and coiled CNF; the amorphous matrix of the coiled carbon nano fiber contains crystallized carbon nanoparticles. The measured quantity of the coiled nano carbon material of composited nano carbon material layer in the total measured quantity of the composited nano carbon material is at least 30%.

Another aspect of the present disclosure is to provide a coiled nano carbon material, which is the scraped objectives from the coiled nano carbon layered substrate of the aforementioned method, which comprises a coiled nano carbon, a coiled nano carbon fiber, and other configurations of nano carbon, wherein the amorphous matrix of said coiled nano carbon fiber has crystallized carbon nanoparticles; the coil-CNT and the coiled nano carbon fiber contains a noble metal selected from the group consisted of latinum, palladium, rhodium, chrome, ruthenium, osmium, iridium, and mixtures thereof. The measured quantity of the total coil-ENT and coiled nano carbon fiber is at least 30%.

In practical applications, the coiled nano carbon material can be electroplated on a conductive material, by using composited electroplating process or electroless-plating process, for the use in the field of electric field emission. Alternatively, the coiled nano carbon material can be mixed into polymer matrixes, like polyurethane matrix, for the use of wave-absorption.

In conclusion, the method for fabricating coiled nano carbon material, the coiled nano carbon layered substrate, the coiled nano carbon material of present disclosure have numerous advantages listed below:

The preparing method for coiled nano carbon material of the present disclosure utilizes the amphiphilic characteristic (hydrophilic and non-hydrophilic) of organic chelate noble metal catalyst to bond the noble metal catalyst with the substrate, and the noble metal catalyst can be fixed on the surface of the substrate by deposition and inlay thereof for providing a good adhesion effect with nano a carbon material. What is more, the noble metal catalyst crystallite nucleus layer can be formed by the noble metal catalyst on the substrate and prepare for growing a coiled nano carbon material with higher length-diameter ratio in TCVD. Additionally, the dispersivity and less coacervation of noble metal catalyst on the substrate are improved. In comparison with prior art techniques, the disadvantages they have lead people using prior art techniques are unable to grow coiled nano carbon material or unable to control the quantity fraction of the coiled nano carbon material. Otherwise this invention using different catalysts and operation conditions may be providing in fabricating uniform coiled nano carbon material with high density, pre-determined quantity fractions, and high quantity ratio.

The present disclosure provides a preparing method for coiled nano carbon material using a metal substrate, in which, by replacing the metal substrate with the noble metal catalyst in a noble metal catalyst solution. The specified noble metal catalyst can be bonded with the substrate and fixed on the surface of the substrate by deposition and inlay thereof for providing a good adhesion effect with nano carbon material in order to fabricate composited nano carbon material with higher density and coiled nano carbon material with higher purity.

Because that the coiled nano carbon layered substrate of the present disclosure contains high measured quantity of coiled nano carbon material, and the amorphous matrix of the coiled nano carbon fiber has crystallized carbon nanoparticles, the substrate with coiled nano carbon layer can be applied to be the cathode for electric field emission.

The purity of the coiled nano carbon material fabricated by using the method of the present disclosure is way higher than those disclosed in prior arts; it can be applied into the field of wave-absorption.

BRIEF DESCRIPTION OF THE DRAWINGS

The structure and the technical means adopted by the present invention to achieve the above and other objects can be best understood by referring to the following detailed description of the preferred embodiments and the accompanying drawings.

FIG. 10 is a transmission electron microscope (TEM) image of crystallized carbon nanoparticles of coiled carbon nano fiber;

DETAILED DESCRIPTION OF THE PREFERRED EMBODIMENTS

The structure and technical features of the present invention will now be described in considerable detail with reference to some embodiments and the accompanying drawings thereof, so that the present invention can be easily understood.

Figure 1:
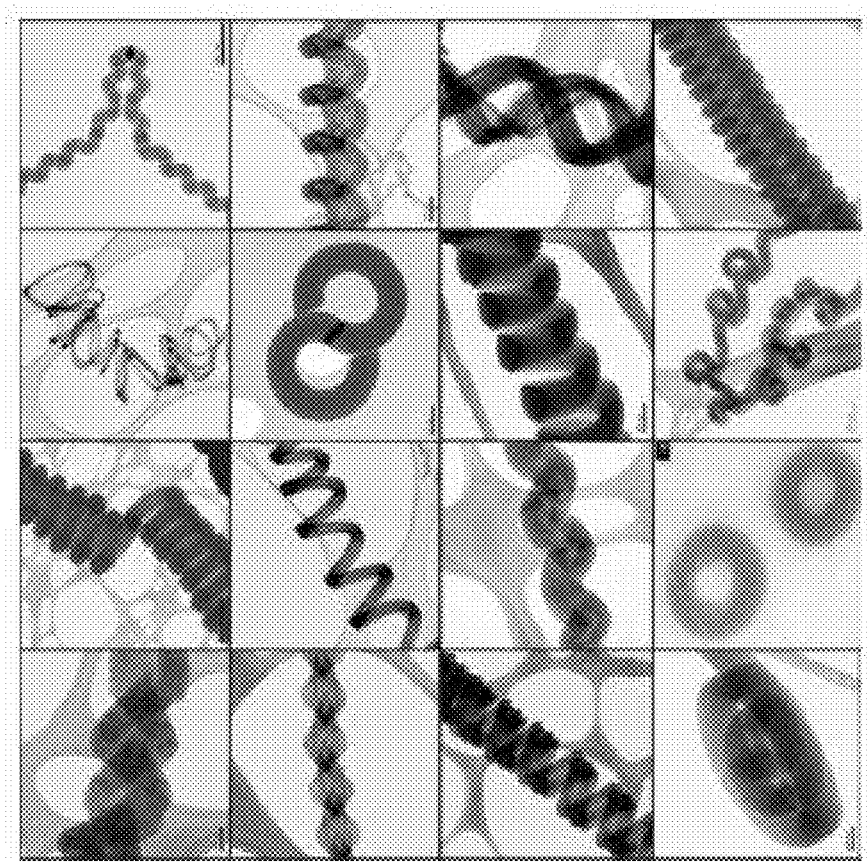
FIG. 1 is a topography showing different nano carbon materials.
Figure 2:
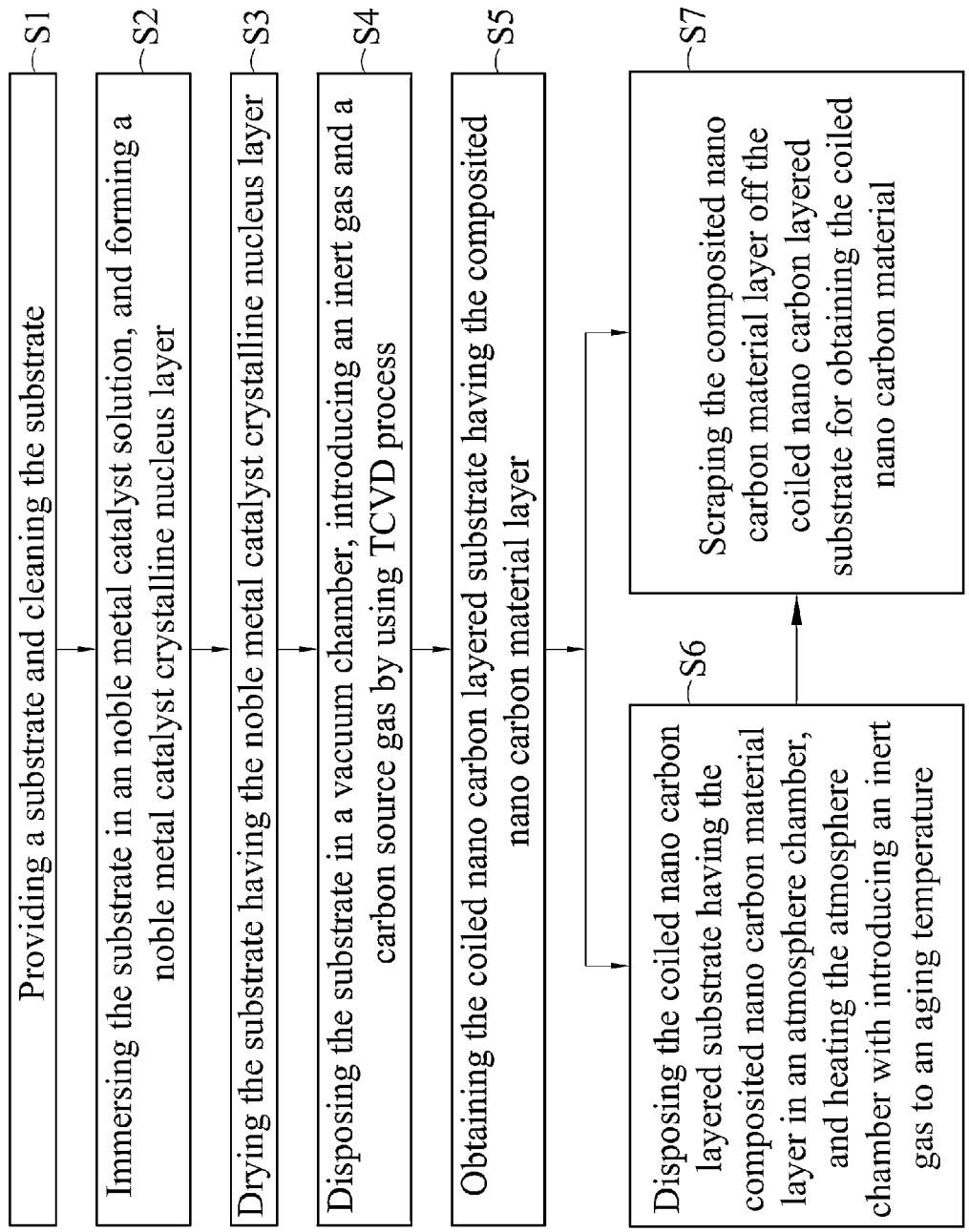
FIG. 2 is a flow chart illustrating a preparing method for coiled nano carbon material of the present disclosure.
Figure 3:
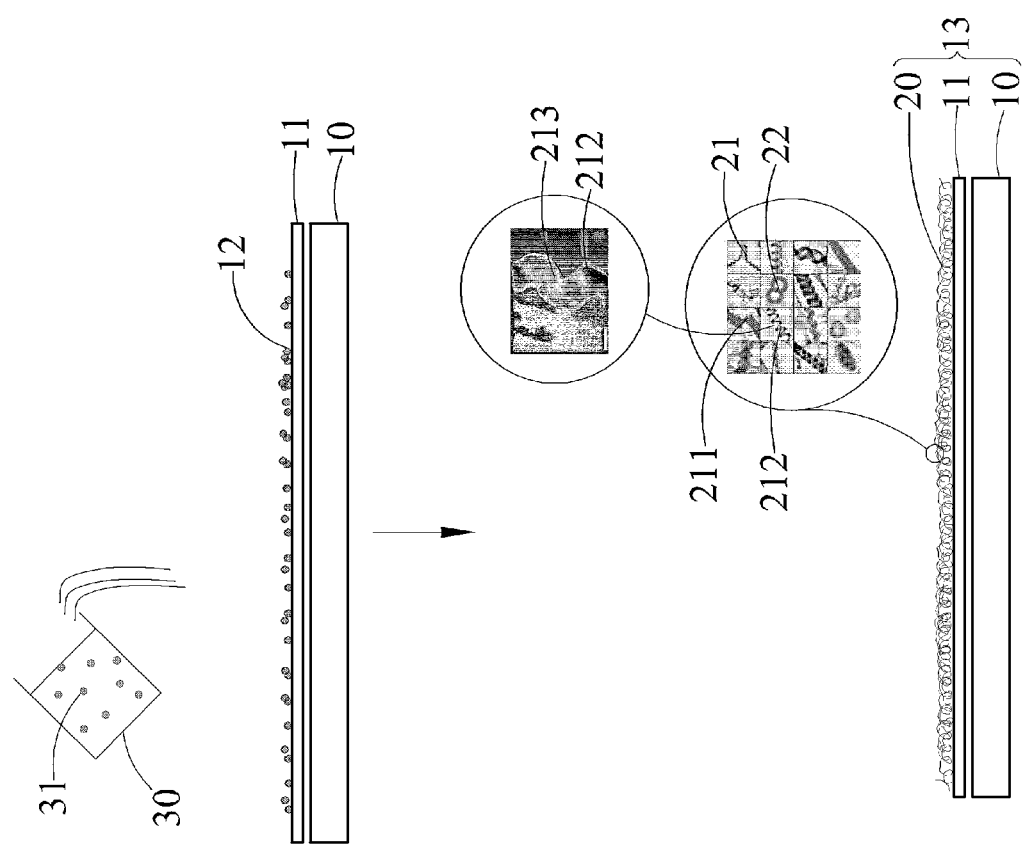
FIG. 3 is a schematic diagram illustrating the fabricating process of substrate with coiled nano carbon layer of the present disclosure.

Refer to FIG. 2 and FIG. 3, a substrate 10 of the present disclosure was immersed in a noble metal catalyst solution 30 which contains noble metal catalyst 31, and a noble metal catalyst crystallite nucleus layer 12 is formed on the substrate 10. By using thermal chemical vapor deposition process, a carbon source gas is introduced thereinto, and the noble metal catalyst crystallite nucleus layer 12 is formed, and then a composited nano carbon material layer 20 is grown on the substrate 10. The aforementioned process comprises the following steps:

Step S1: providing the substrate 10, in which the substrate can be made of silicon materials (e.g. single crystal silicon, polycrystalline silicon, silicon doped with metal), glass, alumina ceramic (e.g. AAO, $Al_2O_3$), metal, and can be electroplated with indium tin oxide material, or combinations thereof. Then, the surface of the substrate 10 is cleaned with pure water or organic solvent; the cleaning manner is not limited to those mentioned above, other cleaning manners such as chemical etching or physical sand blasting is also unlimited. For the purpose of better understanding and comparison, silicon, alumina, and iron-cobalt-nickel alloy substrates are taken as examples in the following; the scope of claims of the present invention should not be limited to those.

Based on the purpose of electric conduction, such as the cathode of field emission used, the surface of the substrate 10 can be conductive; while substrate 10 is made of non-metal materials, such as silicon or alumina, a metal layer 11 can be formed on the surface of the substrate 10 by using electroless plating or doping with nickel, copper, etc.

Regarding to the substrate 10 surface cleaning manner of step S1, the following first embodiment utilizes a p-type silicon wafer as the substrate 10, and the substrate 10 is immersed into acetone, the substrate 10 is then ultrasonicated for 10 min to remove residues, and then the substrate 10 is rinsed with pure deionized water. Afterwards, a $SiO_2$ oxidized layer of the substrate 10 is etched by immersing it into a 10% HF etching solution and rinsed with deionized water and then nitrogen dried. The second embodiment utilizes porousness anodic aluminum oxide as the substrate 10, and degreases the surface of the substrate 10 by rinsing with NaOH. Afterwards, the substrate 10 is polished by a mixed solution of $HClO_4$ and ethanol, and then the substrate 10 is immersed in an anodixing electrolyte and applied with an electric voltage of 10V for 20 min; the substrate 10 is then rinsed with deionized water and then nitrogen dried. Furthermore, the third embodiment utilizes a 304 stainless steel substrate 10, and cleaned with acetonitrile and 10% HCl, and then the substrate 10 is rinsed with deionized water and dried.

Step S2: the substrate 10 is immersed in, or covered with a noble metal catalyst solution 30 which contains a noble metal catalyst 31 chelated by an organic chelate, thereby forming a noble metal catalyst crystallite nucleus layer 12 on the surface of the substrate 10 by displacement of the noble metal catalyst 31. In which the noble metal can be platinum, palladium, rhodium, chrome, ruthenium, osmium, iridium, and mixtures thereof, and the organic chelate can be "A" (copolymer of styrene monomer and N-isopropylacrylamide monomer (Poly(Styrenea-Co-NIPAAmb)), "B" (copolymer of styrene monomer and polyester oligomer), "C" (copolymer of styrene monomer and methyl methacrylate (PS-co-PMMA[poly (styrene-co-methyl methacrylate)])), "D" (ethylene vinyl acetate copolymer), "E" (copolymer of polyvinyl acetate and chitosan (poly(vinyl acetate) chitosan (CS)-graft-poly(vinyl acetate)), or combinations thereof. In which "A" can be organic chelated noble metal catalyst 31 formed by polystyrene composited material of metal nanoparticles disclosed under TW Pat. No. I324616, alternatively, the organic chelate can be copolymers of styrene monomer and N-isopropylacrylamide monomer (Pd(Styrenea-Co-NIPAAmb)), or polystyrene oligomer.

For the purpose of better understanding and comparison, organic chelated noble metal catalyst 31 of platinum, palladium, rhodium are taken as examples in the following. Additionally, the organic chelated palladium (Pd(Styrenea-Co-NIPAAmb)) is chosen to be as the organic chelated noble metal catalyst 31 in the following embodiments, and the scope of claims of the present invention should not be limited to this.

Figure 4:
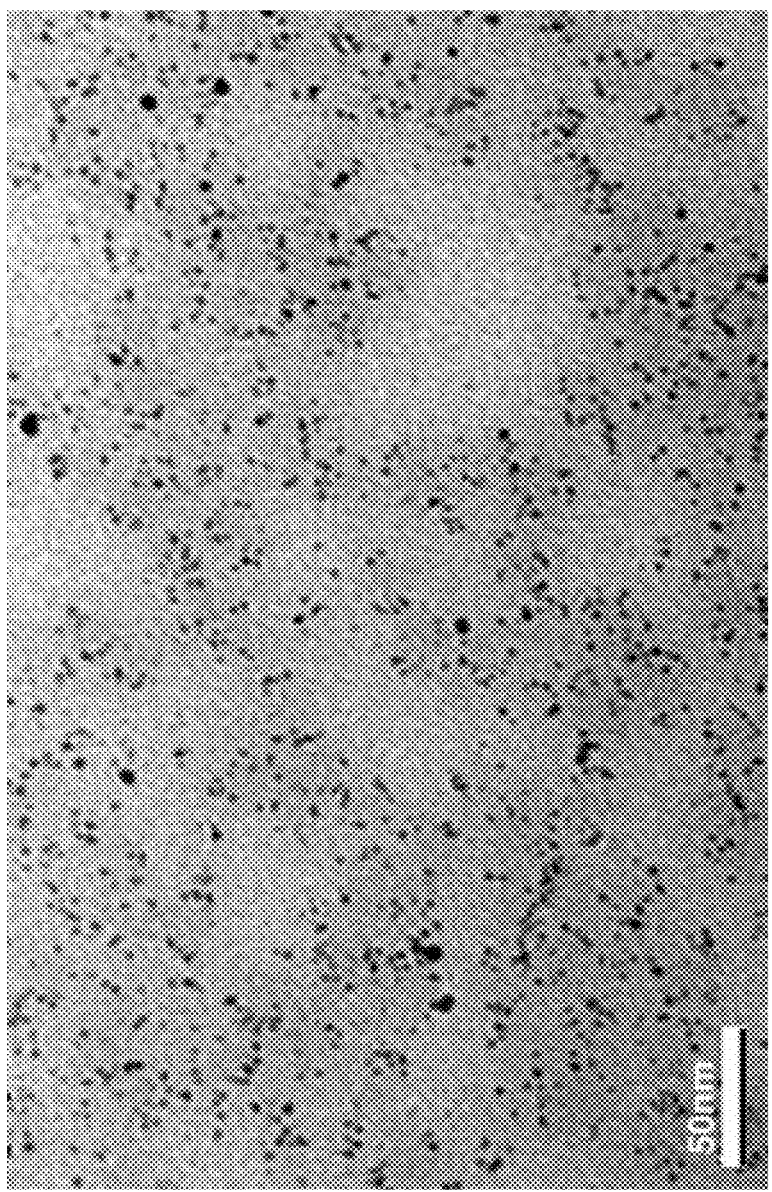
FIG. 4 is a transmission electron microscope (TEM) image of a noble metal catalyst crystallite nucleus layer.

Pd(Styrenea-Co-NIPAAmb) was fabricated by using a method disclosed under a previous study (Yih-Ming Liu, Ming-Der Ger, et al. "Low temperature fabrication of Ni—P metallic patterns on ITO substrates utilizing inkjet printing"; Microelectronics Reliability Vol 52, Issue 2, February 2012). FIG. 4 is a transmission electron microscope (TEM) image of the noble metal catalyst crystallite nucleus layer 12 (Pd(Styrenea-Co-NIPAAmb) is selected to be used in this figure) on the surface of the substrate 10.

Besides, organic chelate "B" (copolymer of styrene monomer and polyester oligomer), "C" (copolymer of styrene monomer and methyl methacrylate (PS-co-PMMA[poly(styrene-co-methyl methacrylate)])), "D" (ethylene vinyl acetate copolymer), or "E" (copolymer of polyvinyl acetate and chitosan (poly(vinyl acetate) chitosan (CS)-graft-poly(vinyl acetate)) may also be bonded with the noble metal catalyst 31 (platinum, palladium, rhodium, chrome, ruthenium, osmium, iridium, etc.) for forming the organic chelated noble metal catalyst 31.

Step S3: the substrate 10 having the noble metal catalyst crystallite nucleus layer 12 is put in oven to dry, in which the drying temperature can be, usually, ranged from room temperature to 150° C., which, preferably, does not damage the noble metal catalyst 31; furthermore, other drying processes are also unlimited, such as nitrogen drying, etc.

Step S4: the substrate 10 having the noble metal catalyst crystallite nucleus layer 12 formed thereon is disposed in a vacuum chamber following by a thermal chemical vapor deposition (TCVD) process which includes, performing a vacuumed environment with an initial vacuum preferably higher than a degree of vacuum of 0.1 torr, introducing a mixture of a carbon source gas and an inert gas into the chamber, in which the carbon source gas can be a hydrocarbon gas, more preferably, without oxygen, such as acetylene gas, methane gas or a mixture thereof; the inert gas can be hydrogen, argon, helium, or mixtures thereof. The vacuum chamber is then being heated to a predetermined growth temperature Tk; such a predetermined growth temperature (Tk) is ranged from 500° C. to 900° C.

Figure 5:
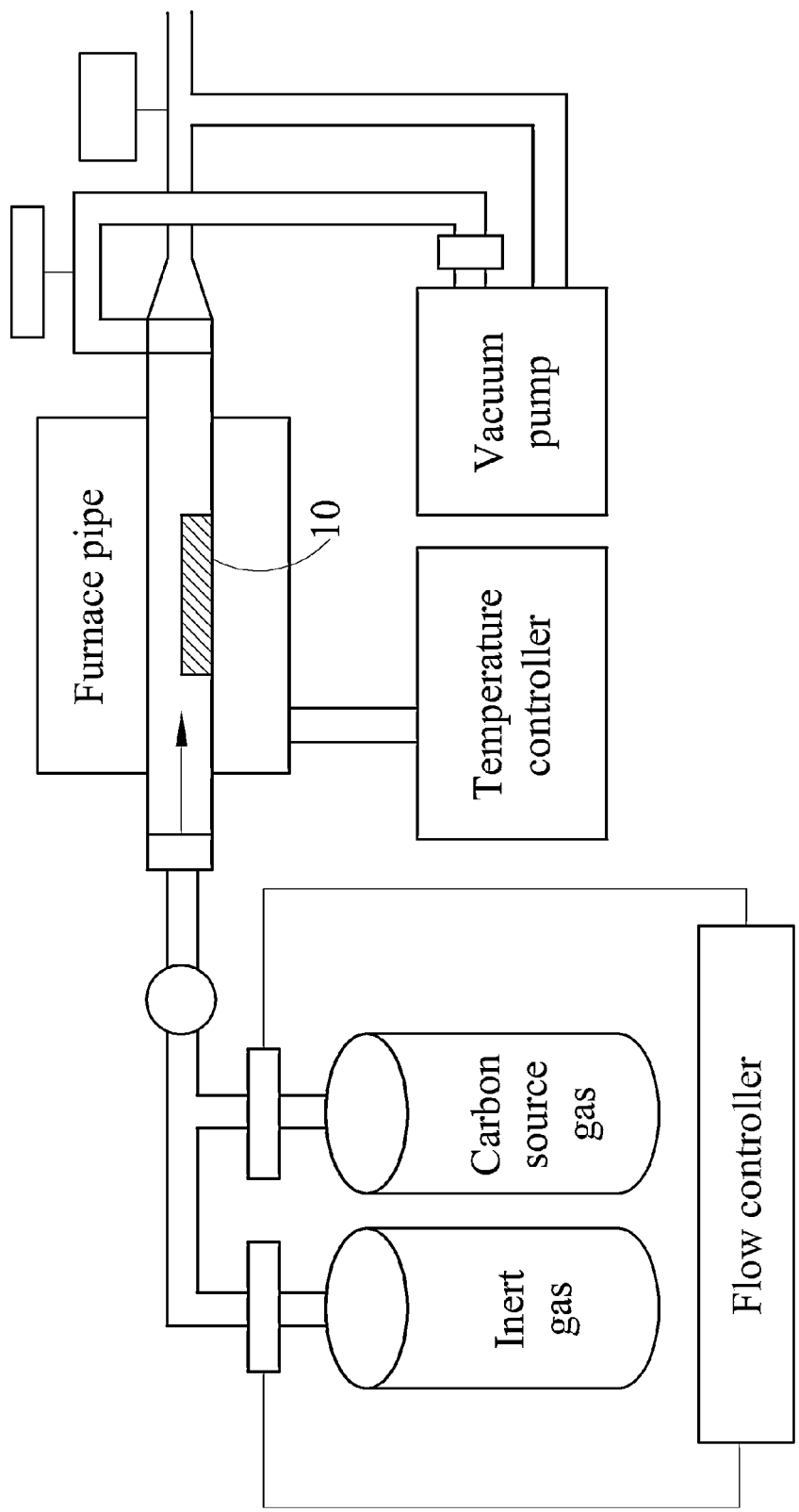
FIG. 5 is a schematic diagram of a thermal chemical vapor deposition apparatus.

Referring to FIG. 5, before continuing on the TCVD process, the vacuum chamber can be extracted air by a vacuum pump and then an inert gas is introduced for air exclusion, and the noble metal catalyst 31 can be active. Next, a furnace pipe is used for heating, and the temperature controller is used for controlling the reaction temperature. In the atmospheric high-temperature annealing, the catalyst nanoparticles are formed from the noble metal catalyst 31 on the substrate 10. Then, the carbon source gas ($C_nH_m$) is introduced and controlled by the flow controller to react with the catalyst nanoparticles in the chamber. By choreographed controlling the flow of the carbon source gas and inert gas, the carbon atoms in the carbon source gas are decomposed. The carbon atoms are then adhered to and stacked on the surface of the noble metal catalyst 31 for the growth of the composited nano carbon material layer 20.

Step S5: the composited nano carbon material layer 20 is grown with a predetermined growing time (5 min to 60 min), the composited nano carbon material layer 20 can be grown on the substrate 10. After cooling, a substrate with coiled nano carbon layer 13 having the composited nano carbon material layer 20 is produced from the vacuum chamber; the predetermined growing time should not be limited to the above mentioned; however, if this predetermined growing time is too short, the yield of the nano carbon material would be relatively low; on the contrary, if the predetermined growing time is too long, not only time would be wasted, but the nano carbon material would probably be stacked in causing unevenness.

The aforementioned noble metal catalyst 31 is selected from the group consisting of platinum, palladium, rhodium, chrome, ruthenium, osmium, iridium, and mixtures thereof, thereby can be accelerating to decompose the carbon source gas (acetylene or methane) on the surface by the noble metal catalyst 31, and can be reducing the predetermined growth temperature Tk. In which the decomposition effect would be preferable by using platinum, palladium, or rhodium as the noble metal catalyst 31 under relatively low temperatures, and in which by using palladium as the noble metal catalyst 31, the temperature during TCVD may be reduced and the yield of the composited nano carbon material can be increased, therefore palladium is chosen to be as the noble metal catalyst 31 in the following examples. In addition, organic chelated palladium (Pd(Styrenea-Co-NIPAAmb)) is also chosen to be as the organic chelated noble metal catalyst 31 in the following embodiments, and the scope of claims of the present invention should not be limited to these.

The composited nano carbon material layer 20 is a mixture containing coiled carbon nano tubes and other forms of nano carbon materials (e.g. linear carbon nano tube, linear carbon nano fiber, and a small quantity of graphite, graphene, or other forms of graphite), the composition proportion of the measured quantity differs and depends on the selected noble metal catalyst, the initial vacuum, the predetermined growth temperature, and the predetermined growing time. Referring to FIG. 6 to FIG. 10, the coiled nano carbon material 21 (see FIG. 6) is a mix of coiled carbon nano tube 211 (coil-CNT) and coiled carbon nano fiber 212, the coil-CNT 211 is hollow-shaped (see FIG. 8), the coiled nano carbon fiber 212 is solid (see FIG. 7), the amorphous matrix of the coiled carbon nano fiber 212 has crystallized carbon nanoparticles 213; in which the morphology of coil-CNT 211 or coiled nano carbon fiber 212 is spring-shaped (see FIG. 9 (B)) or continuously coiled (twist-shaped) (see FIG. 9 (A)). The dotted lines in FIG. 10 indicates crystallized carbon nanoparticles 213 of coiled carbon nano fiber 212, in which FIG. 10 (B) is an enlarged view of FIG. 10 (A). In the following embodiments, the crystallize appearance inside the coiled nano carbon material 21 is confirmed by using a high Resolution-Transmission Electron Microscope (HR-TEM) for observing the high-resolution image of the crystallized carbon nanoparticles.

The composited nano carbon material layer 20 with high purity can be fabricated by using the aforementioned method, and the measured quantity of the coiled nano carbon material 21 (the total of coil-CNT and coiled nano carbon fiber) of the composited nano carbon material layer 20 in a total measured quantity of the composited nano carbon material is, in average, at least 30%; that is, the average quantity of each surface area on the composited nano carbon material layer satisfies:

$$\frac{C_{Coil\text{-}CNT} + C_{coil\text{-}CNF}}{C_T} \geq 30\%.$$

Where $C_{coil\text{-}CNT}$ is the measured quantity of coil-CNT 211, $C_{coil\text{-}CNF}$ is the measured quantity of coiled carbon nano fiber 212, $C_T$ is the total measured quantity of nano carbon material. Further, the measured quantity is the total quantity of nano carbon material in each surface area on the composited nano carbon material layer 20 counted by using a field emission scanning electron microscope; FE-SEM.

Figure 6:
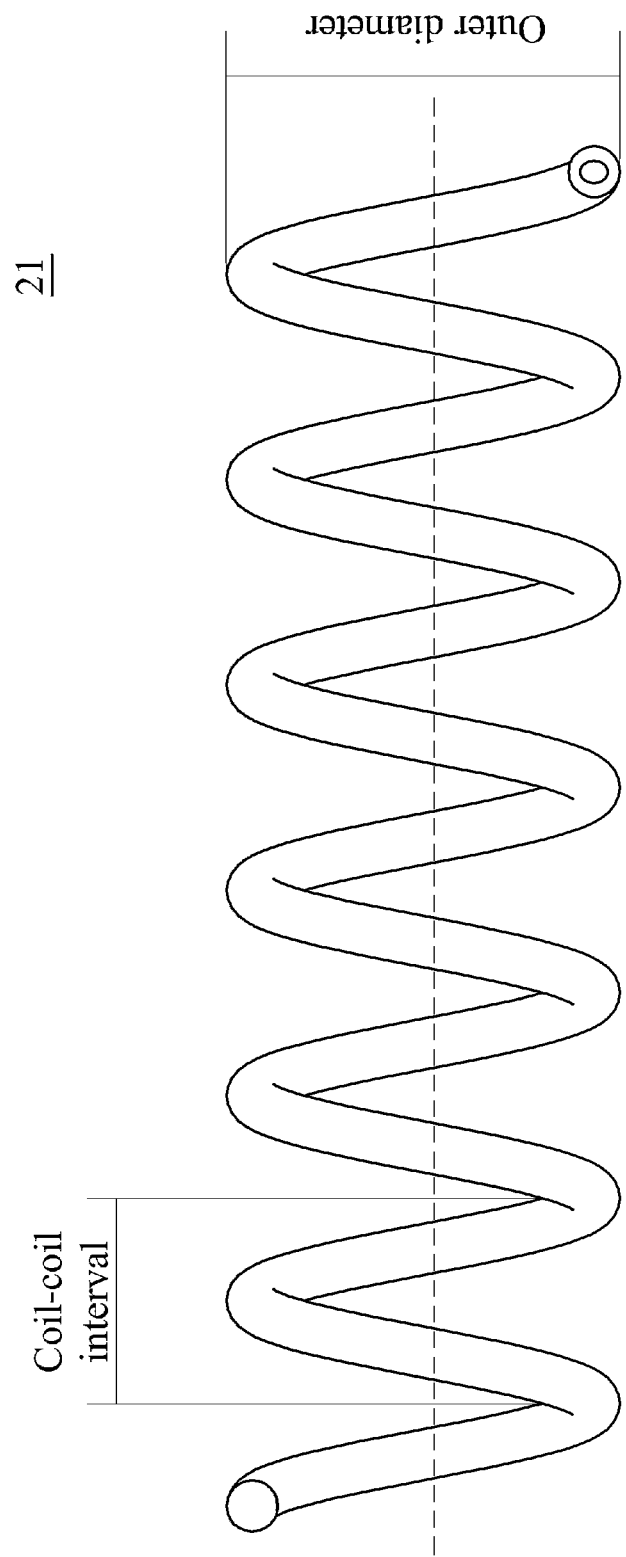
FIG. 6 is a schematic diagram of a structure of coiled carbon nano tube or coiled carbon nano fiber.
Figure 7:
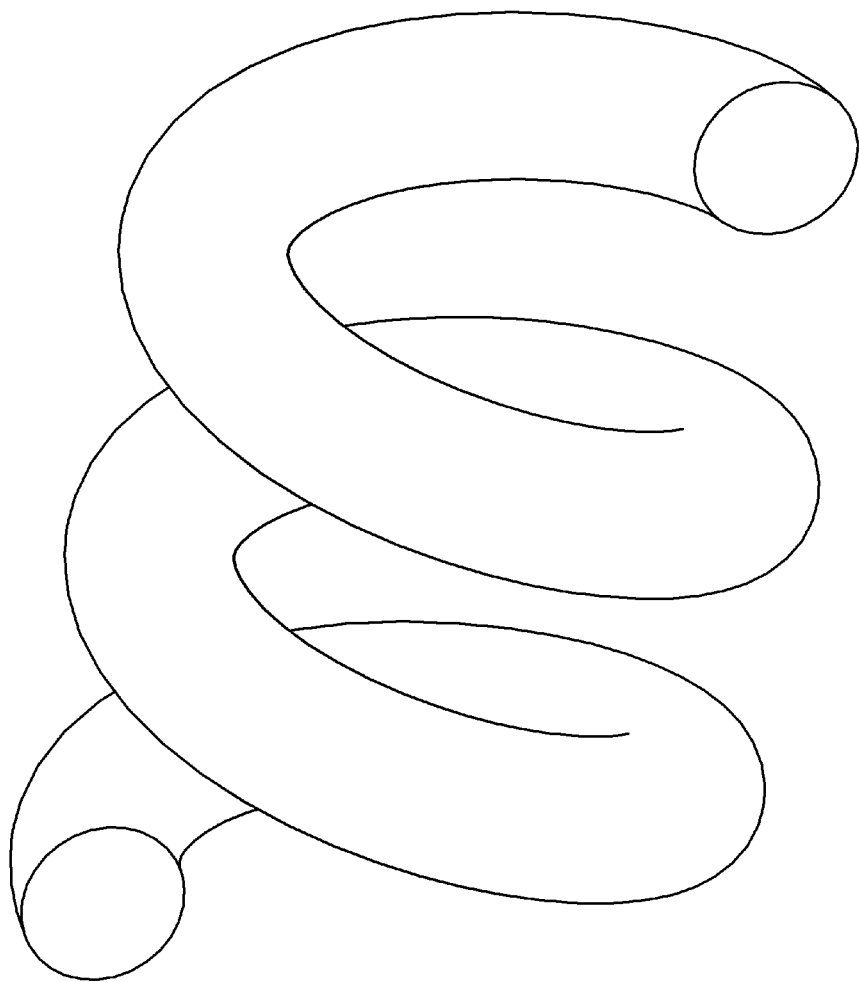
FIG. 7 is a schematic diagram of a solid structure of coiled carbon nano fiber.
Figure 8:
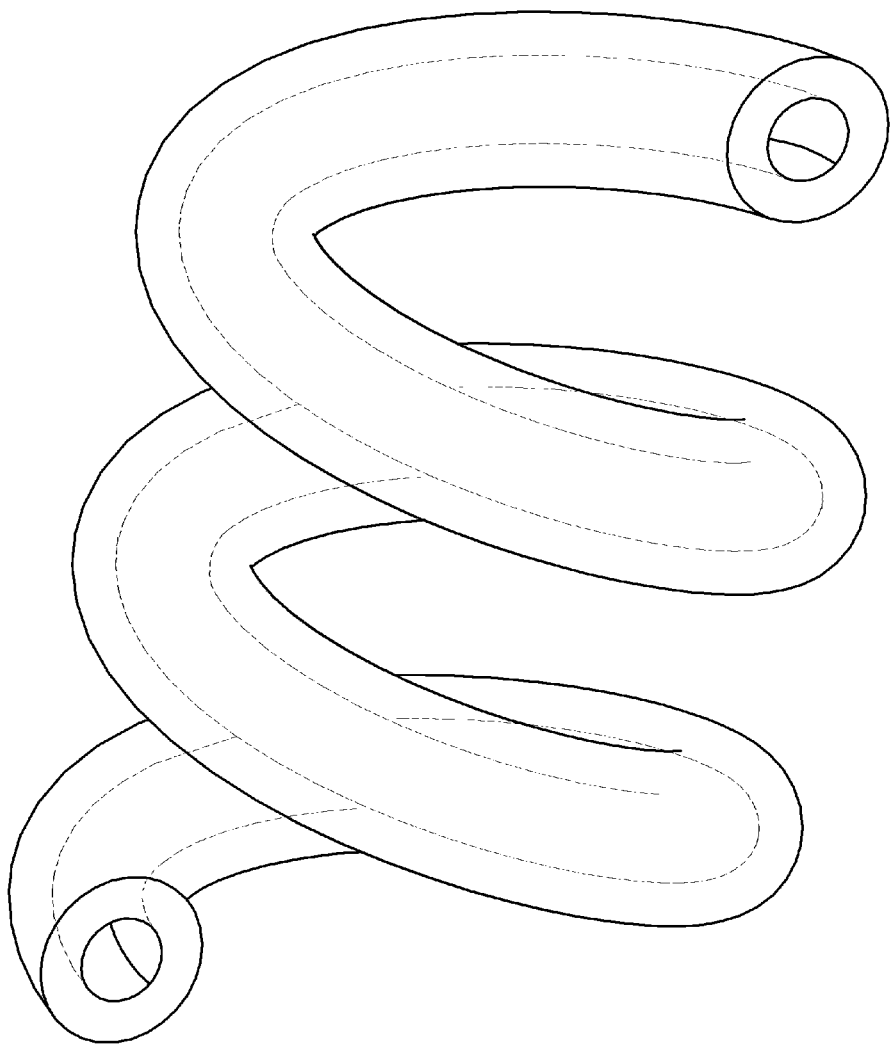
FIG. 8 is a schematic diagram of a hollow structure of coiled carbon nano tube.
Figure 9:
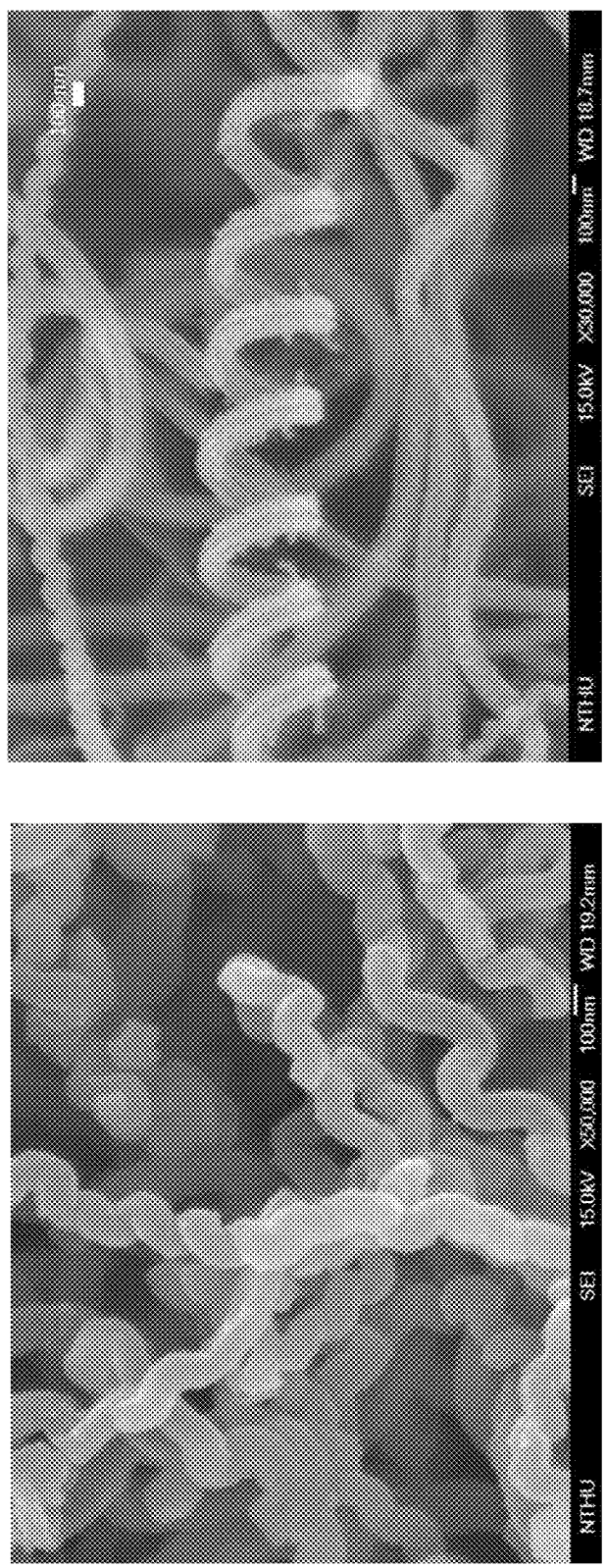
FIG. 9 is a transmission electron microscope (TEM) image of coiled nano carbon material of the present disclosure.

The coil-coil intervals as well as the coil outer diameter of the coil-CNT and the coiled nano carbon fiber differs and depends on different growing conditions (see FIG. 6). Furthermore, different concentrations of noble metal ions in the noble metal catalyst 31 causes different outer diameters of the coiled nano carbon material 21. For instance, while using a concentration of 200~500 ppm of the noble metal catalyst 31, the outer diameter of the coiled nano carbon material is 51.1±9.3 nm; while using a concentration of 500~800 ppm of the noble metal catalyst 31, the outer diameter of the coiled nano carbon material is 154.2±23.9 nm. The operation conditions in step S2 to step S5 can be altered to acquire different specifications of the coiled nano carbon material 21 according to different purposes.

Figure 11:
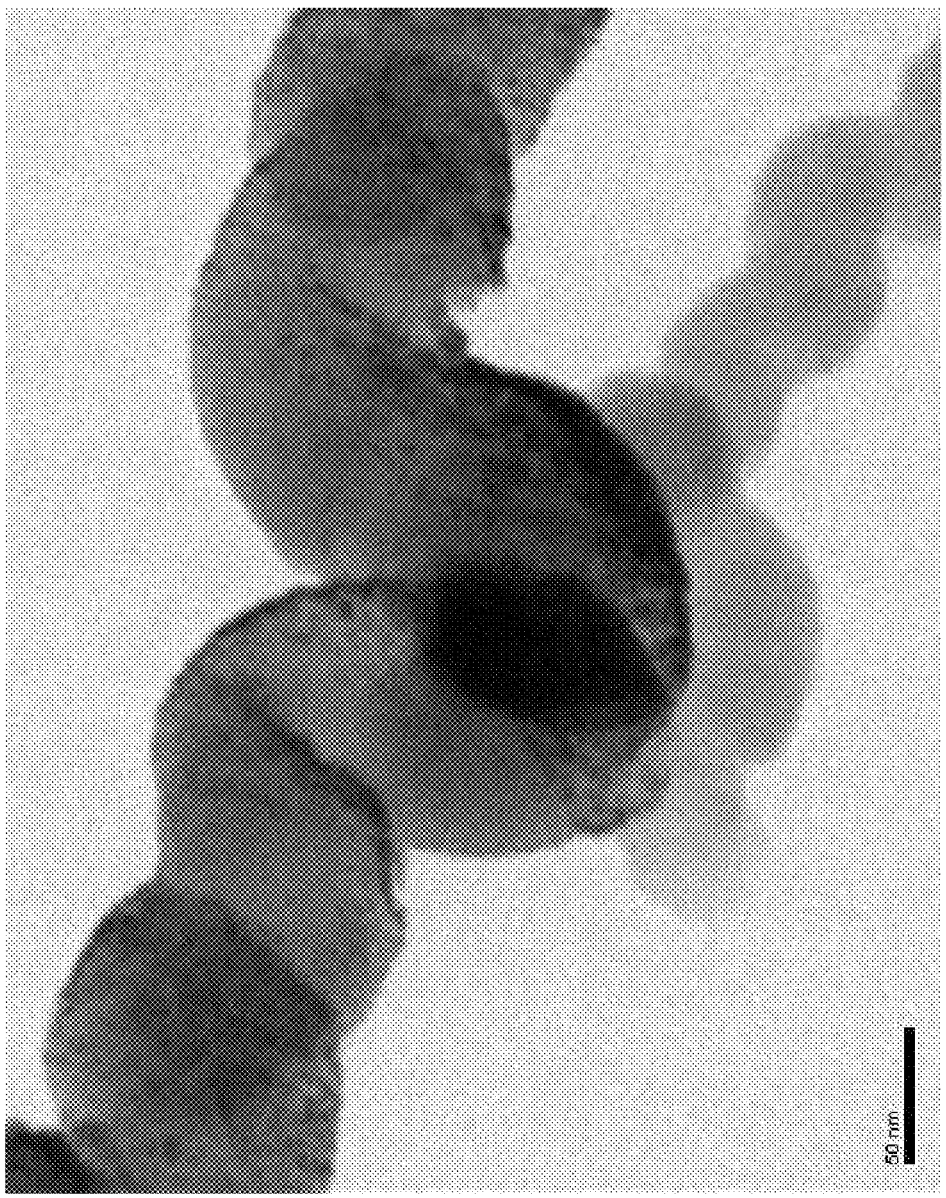
FIG. 11 is a transmission electron microscope (TEM) image of coiled carbon material growing on both ends of palladium metal catalyst crystallite nucleus layer.

In the following embodiments, the coiled nano carbon material 21 has different growing mechanisms during TCVD while using (Pd(Styrenea-Co-NIPAAmb)) as the noble metal catalyst 31. For instance, if the noble metal catalyst 31 crystallite nucleus (palladium metal catalyst crystallite nucleus) is lodged into the coiled nano carbon material 21 then the coiled nano carbon material 21 will be grown along a 2D direction from the noble metal catalyst 31 crystallite nucleus (palladium metal catalyst crystallite nucleus), namely the growing center, with different coiling directions (clockwisely coiling or counterclockwisely coiling) (see FIG. 11). Alternatively, the coiled nano carbon material 21 can grow on the surface of the noble metal catalyst 31 crystallite nucleus along a 2D direction with different coiling directions (clockwisely coiling or counterclockwisely coiling).

In general, the higher the predetermined growth temperature Tk, the larger the particle size of the catalyst crystallite nucleus formed of noble metal catalyst crystallite nucleus layer 12. For instance, as the predetermined growth temperature reaches 600° C., the coiled nano carbon material 21 would be a mist-shaped coil-CNT 211, and the outer diameter thereof would be 150±38 nm; whereas the predetermined growth temperature reaches 800° C., the outer diameter of the coiled nano carbon material 21 would be about 176 nm, and the inner diameter thereof would be about 96 nm. The operation conditions in step S2 to step S5 can be altered to acquire different specifications of the coiled carbon material 21 according to different purposes.

Afterwards, an aging process can be performed:

Step S6: the substrate with coiled nano carbon layer 13 having the composited nano carbon material layer 20 is disposed in an atmosphere chamber, and heating the atmosphere chamber with introducing an inert gas to an aging temperature Tc in order to proceed an aging step; unstable nano carbon materials may be removed during this process, such that the measured quantity of the coiled nano carbon material of the composited nano carbon material layer in the measured quantity of the composited nano carbon material can be increase, in average, 3~10%. The aforementioned aging temperature, Tc, is higher than 200° C., and the aging period can be shortened by using a higher temperature. The aging temperature can, but should not be limited to 200° C.≤Tc≤500° C.

Step S7: the coiled nano carbon material 21 can then be obtained by scraping the composited nano carbon material layer 20 off the substrate with coiled nano carbon layer 13 formed by the aforementioned step S5 or step S6.

The measured quantity of coiled nano carbon material 21 fabricated by using the method of the present disclosure in the total measured quantity of nano carbon material is greater than or equal to 30%; the ratio (composition proportions) of the measured quantities differs and depends on the selected organic metal catalyst 31, the initial vacuum, the predetermined growth temperature, the predetermined growing time and the operation conditions. Even for other embodiments, the ratio of the measured quantity of the coiled nano carbon material 21 can be greater than or equal to 80%.

Comparing the coiled nano carbon material 21 with other carbon nano tubes or other nano carbon materials, the coiled nano carbon material 21 has better field emission characteristics, such as better field emission spots uniformity, better luminance uniformity, and longer working life, so that coiled nano carbon material 21 can be applied as a cathode emission source of field emission; besides, the coiled nano carbon material 21 can also be applied to microwave-absorbing materials.

Figure 12:
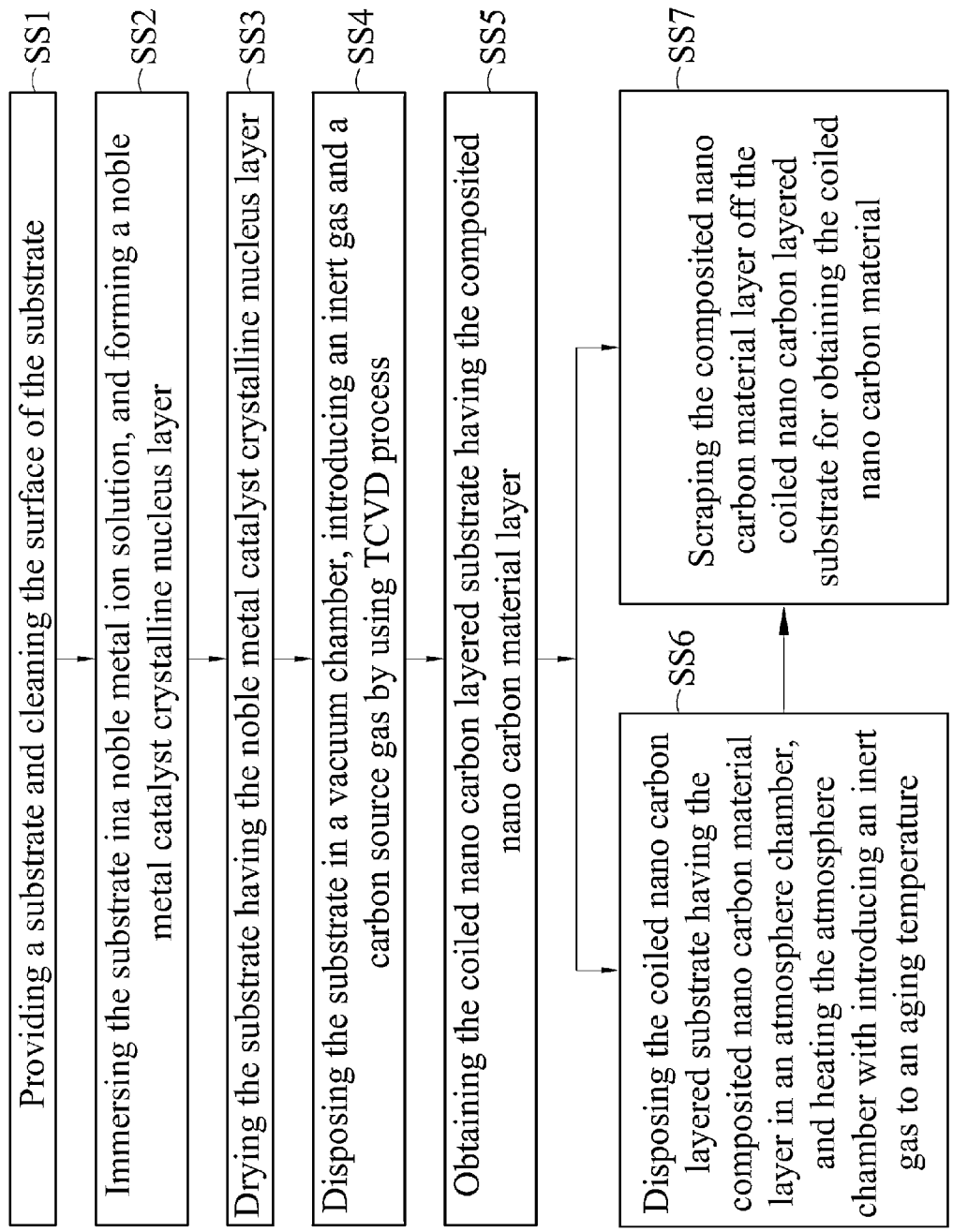
FIG. 12 is a flow chart illustrating a preparing method for coiled nano carbon material.

Based on the purpose of further enhancement of the measured quantity ratio of the coiled nano carbon material 21, the following steps for fabricating coiled carbon nano material 21 are recommended and included (see FIG. 12):

Step SS1: providing the substrate 10, in which the substrate 10 can be made of iron-nickel alloy, iron-cobalt-nickel alloy, nickel, nickel-copper, copper alloy, or combinations thereof. Then the substrate 10 is cleaned with pure water or organic solvents; the cleaning manner is not limited to those mentioned above, other cleaning manners such as chemical etching or physical sand blasting are also unlimited. Further, if the substrate 10 is made of non-metal materials, such as silicon or alumina, a metal layer 11 can be formed on the surface of the substrate 10 by using electroless plating or doping with nickel, copper, etc.

Step SS2: the substrate 10 is immersed in, or covered with a noble metal ion solution, displacing the metal of the substrate 10 surface with a noble metal, and forming a noble metal catalyst crystallite nucleus layer 12. In which the noble metal ion solution is prepared from a solution of chloride, sulfate, acetate, and mixtures compounded of platinum, palladium, rhodium, chrome, ruthenium, osmium, iridium, and mixtures thereof. By using the noble metal ion solution to displace the nickel, iron, copper, or cobalt with noble metal in order to form the noble metal catalyst crystalline nucleus layer 12. Based on different purposes, the substrate 10 having the noble metal catalyst crystalline nucleus layer 12 can be further immersed into the aforementioned organic chelated noble metal catalyst solution 30, so that the surface of the substrate 10 can be adhered with the composited noble metal catalyst crystalline nucleus layer 12 formed from the organic chelated noble metal catalyst 31.

In this step, the noble metal ions in the noble metal ion solution obtains electrons released from the substrate 10 during oxidation thereof by utilizing the oxidation-reduction potential between noble metal ion and the nickel, iron, copper, or cobalt on the surface of the substrate 110, thereby directly forming noble metal micro spots on the substrate 10; none of any additional reducing agents were used to provide electrons for reduction in following embodiments. In the following fourth and fifth embodiments of the present disclosure, the oxidation-reduction potential between the substrate 10 and the noble metal ion in the electroless plating solution (e.g. palladium ions released from palladium chloride) is used. When the reduction potential of the noble metal ion is greater than the reduction potential of the substrate 10, an oxidative dissolution of the substrate 10 will be performed, in which electrons will be released and transferred to the metal ions in the plating solution, The metal ions will be reduction and will be electroless plating on the surface of the substrate 10. Once the substrate 10 is completely plated, this plating reaction will be ceased. This replacing manner includes heating a proper concentration of palladium chloride solution (300~1500 ppm) to 50~95° C. by a heating device, cleaning the substrate 10 (non-electroplated substrate, Ni—P composited metal substrate, silicon substrate, alumina substrate), depositing the substrate 10 into the noble metal catalyst solution for redox reactions, and after a reaction period, rinsing the substrate 10 with deionized water and drying the substrate 10 with nitrogen gas (or oven dried); this process merely utilizes the oxidation-reduction potential between noble metal ions and the substrate 10 in the plating solution to transfer the released electrons from the substrate 10 to the noble metal ions, thereby forming the noble metal catalyst 31 on the substrate 10; none of any additional reducing agents were used to provide electrons for this reducing process, and thus simplifying the steps and the parameters in this process under the premise of having excellent uniformity of the distribution of the noble metal catalyst 31 crystalline nucleus on the surface of the substrate 10.

According to the step of adhering nickel, copper, or other metals onto the surface of the substrate 10 mentioned above, electroless plating or composited electroplating manner can be used for adhering metals onto the surface of the substrate 10. Then, the metal adhered on the surface of the substrate 10 is replaced with noble metal, so that the noble metal catalyst crystalline nucleus layer 12 can be formed, such as the Pd and Ni catalyst crystalline nucleus layer can be formed on the nickel substrate 10 by reacting with palladium chloride, or in the sixth embodiment, the Pd and Ni—P co-catalyst crystalline nucleus layer can be formed on the metal or non-metal substrate 10 by using palladium chloride and Ni—P. Further, in the same embodiment, the Pd and Ni—P co-catalyst crystalline nucleus layer can be formed on the non-metal silicon substrate 10 by chemical plating Ni—P alloy thereon; the principle of chemical plating Ni—P is, firstly; interactions between electrons and hydrogen atom released from hydrolysis and self-catalyzed dehydrogenation would be performed under a condition of heating and catalyzing with reducing agent $H_2PO_2$, so that Ni would be deposited on the surface of the substrate 10 after $Ni_2^+$ were neutralized with electrons and reduced:

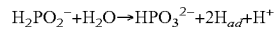
$$H_2PO_2^- + H_2O \rightarrow HPO_3^{2-} + 2H_{ad} + H^+$$

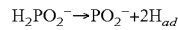
$$H_2PO_2^- \rightarrow PO_2^- + 2H_{ad}$$

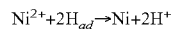
$$Ni^{2+} + 2H_{ad} \rightarrow Ni + 2H^+$$

Where P element is deposited by the reduction of $H_2PO_2^-$ with hydrogen atom, and self-redox reactions thereof:

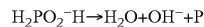
$$H_2PO_2^-H \rightarrow H_2O + OH^- + P$$

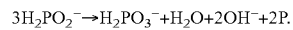
$$3H_2PO_2^- \rightarrow H_2PO_3^- + H_2O + 2OH^- + 2P.$$

Step SS3: the substrate 10 having the noble metal catalyst crystalline nucleus layer 12 is dried, in which the drying temperature can be, usually ranged from room temperature to 150° C., which, preferably does not damage the noble metal catalyst; furthermore, other drying processes are also unlimited, such as nitrogen drying, etc.

Step SS4: the substrate 10 having the noble metal catalyst crystallite nucleus layer 12 formed thereon is disposed in a vacuum chamber, performing a vacuumed environment with an initial vacuum preferably higher than a degree of vacuum of 0.1 torr, introducing a mixture of a carbon source gas and an inert gas into the chamber for the process of TCVD, in which the carbon source gas can be a hydrocarbon gas, more preferably, without oxygen, such as acetylene gas, methane gas or a mixture thereof; the inert gas can be hydrogen, argon, helium, or mixtures thereof. Then, heating the vacuum chamber to a predetermined growth temperature Tk; the predetermined growth temperature (Tk) is ranged from 550° C. to 900° C.

Step SS5: the composited nano carbon material layer 20 on the substrate 10 is grown with a predetermined growing time (5 min to 60 min), then, after cooling, obtaining the substrate with coiled nano carbon layer 13 having the composited nano carbon material layer 20.

In which, the composited nano carbon material layer 20 is a mixture of the coiled nano carbon material 21 and other kinds of nano carbon materials; the coiled nano carbon material is a mixture of coil-CNT 211 and coiled nano carbon fiber 212, the coil-CNT 211 is coil-shaped carbon nano tube, and the coiled carbon nano fiber 212 is coil-shaped carbon nano fiber. The amorphous matrix of the coiled carbon nano fiber 212 contains crystallized carbon nanoparticles 213. Composited nano carbon material with high purity can be fabricated, and the measured quantity of the coiled nano carbon material 21 of the composited nano carbon material layer 20 in a total measured quantity of the composited nano carbon material is, in average, at least 50%; that is, the average quantity of each surface area on the composited nano carbon material layer 20 satisfies:

$$\frac{C_{Coil\text{-}CNT} + C_{coil\text{-}CNF}}{C_T} \geq 50\%.$$

Further, different concentrations of noble metal ions in the noble metal catalyst 31 causes different outer diameters of the coiled nano carbon material 21. For instance, while using a concentration of 400~800 ppm of the noble metal catalyst 31, the outer diameter of the coiled nano carbon material is 110.9±23.9 nm; while using a concentration of 800~1500 ppm of the noble metal catalyst 31, the outer diameter of the coiled nano carbon material is 154.4±31.4 nm. The operation conditions in step SS2 to step SS5 can be altered to acquire different specifications of the coiled carbon material 21 according to different purposes.

In general, the higher the predetermined growth temperature Tk, the faster the diffusion and deposition rate of carbon atoms. For instance, in the following fourth and fifth embodiments, the outer diameter of the coiled nano material formed with the predetermined growth temperature of 600~700° C. is 150±38 nm. The operation conditions or the predetermined growth temperature Tk in step SS2 to step SS5 can be altered to acquire different specifications of the coiled carbon material 21 according to different purposes.

Afterwards, an aging process can be performed:

Step SS6: the substrate with coiled nano carbon layer 13 having the composited nano carbon material layer 20 is disposed in an atmosphere chamber, and introduced an inert gas (example as nitrogen or argon) to drive the air away, then heating the atmosphere chamber to an aging temperature Tc to proceed on the aging step. Unstable nano carbon materials may be removed during this process, such that the measured quantity of the coiled nano carbon material 21 of the composited nano carbon material layer 20 in the measured quantity of the composited nano carbon material can be increase, in average, at least 52%. The aforementioned aging temperature, Tc, is higher than 200° C., and an aging period can be shortened by using a higher temperature. The aging temperature can, but should not be limited to 200° C.≤Tc≤500° C.

Step SS7: the coiled nano carbon material 21 can then be obtained by scraping the composited nano carbon material layer 20 off the substrate with coiled nano carbon layer 13 formed by the aforementioned step SS5 or step SS6.

The measured quantity of coiled nano carbon material 21 fabricated by using the method of step SS1 to step SS7 of the present disclosure in the total measured quantity of nano carbon material is greater than 50%; the ratio (composition proportions) of the measured quantity differs and depends on the selected noble metal ion solution and organic metal catalyst, the initial vacuum, the predetermined growth temperature, and the predetermined growing time; in other examples, the ratio of the measured quantity of the coiled nano carbon material 21 can be greater than or equal to 90%, that is, with higher purity.

The substrate with coiled nano carbon layer 13 (see FIG. 3) includes the substrate 10, the noble metal catalyst 31 crystalline nucleus layer, and the composited nano carbon material 21; in which the material of the substrate 10 is selected from the group consisting of silicon, glass, alumina ceramic, metal, or the combinations thereof; the noble metal catalyst 31 crystalline nucleus is adhered to the surface of the substrate 10, and the noble metal catalyst 31 crystallite nucleus layer is selected from the noble metal catalyst consisting of platinum, palladium, rhodium, chrome, ruthenium, osmium, iridium, and mixtures thereof. While substrate 10 is made of metal or nonmetal materials, the coiled nano carbon material 21 having the composited nano carbon material layer 20 can be formed on the substrate 10 by using the aforementioned step S1~S5 (S6); and when the substrate 10 is made of metal, the coiled nano carbon material 21 having the composited nano carbon material layer 20 can also be formed on the substrate by using the aforementioned step SS1~SS5 (SS6).

In which, the composited nano carbon material layer 20 is a mixture of coiled nano carbon material 21 and other kinds of nano carbon materials; the coiled nano carbon material is a mixture containing the coil-CNT 211 and the coiled nano carbon fiber 212. The amorphous matrix of the coiled nano carbon fiber 212 contains crystallized carbon nanoparticles. The measured quantity of the coiled nano carbon material 21 of the composited nano carbon material layer 20 in a total measured quantity of the composited nano carbon material is at least 30%. Because that the coiled nano carbon material 21 on the substrate 10 having the composited nano carbon material layer 20 has an excellent field emission characteristics, it can be applied as a cathode emission source of field emission.

The coiled nano carbon material 21 of the present disclosure is obtained by scraping the composited nano carbon material layer 20 off the substrate with coiled nano carbon layer 13 formed by the aforementioned step S1~S5 (S6) or step SS1~SS5 (SS6), which contains the coil-CNT 211, coiled nano carbon fiber 212, and other kinds of nano carbon materials; the coil-CNT 211 is coil-shaped carbon nano tube, and the coiled carbon nano fiber 212 is coil-shaped carbon nano fiber. The amorphous matrix of the coiled nano carbon fiber 212 contains crystallized carbon nanoparticles 213. According to the coil-CNT 211 and the coiled nano carbon fiber 212, in which the coiled nano carbon fiber 212 contains a noble metal located at an end or any other locations thereof, and the noble metal is selected from the group consisting of platinum, palladium, rhodium, chrome, ruthenium, osmium, or iridium, and mixtures thereof; in which the measured quantitative purity of the total coil-CNT 211 and the coiled nano carbon fiber 212 is above 30%; plus, the coil-CNT 211 and the coiled nano carbon fiber 212 have good electromagnetic wave absorption characteristics, so that the coiled nano carbon material can be applied to microwave-absorbing materials and other applications.

A comparison among six embodiments of the present disclosure are performed and listed in Table 1, in which different kind of substrates, noble metal catalysts, and fabricating conditions of the coiled nano carbon material 21 with steps S1~S5 (S6) or steps SS1~SS5 (SS6) were compared, respectively. The comparisons were based on the morphologies according to images scanned by using SEM or TEM. Besides, FIG. 10 is a transmission electron microscope (TEM) image of crystallized carbon nanoparticles 213 of coiled carbon nano fiber 212 according to the third embodiment.

TABLE 1 a comparison among six embodiments with different conditions

Figure 13:
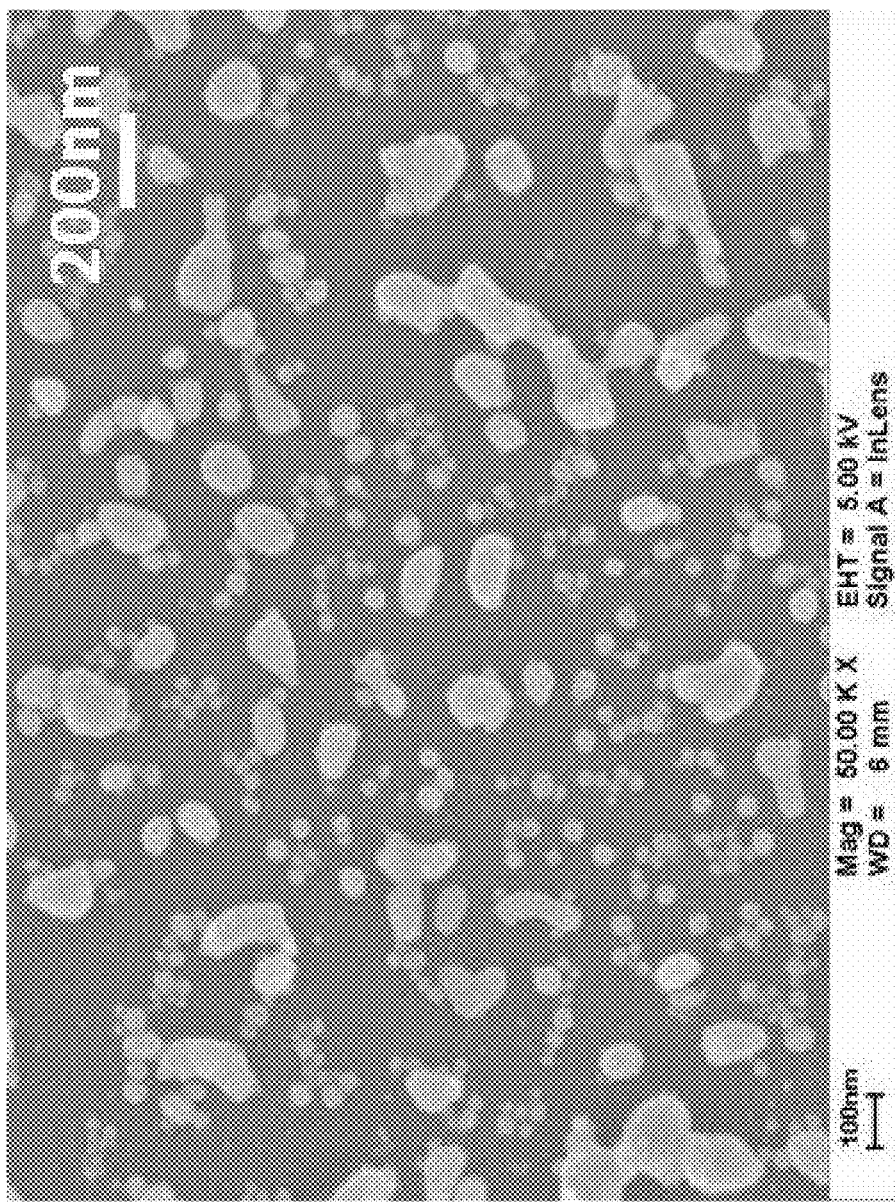
FIG. 13 is a scanning electron microscope (SEM) image of noble metal catalyst crystallite nucleus layer according to the first embodiment of the present disclosure.
Figure 14:
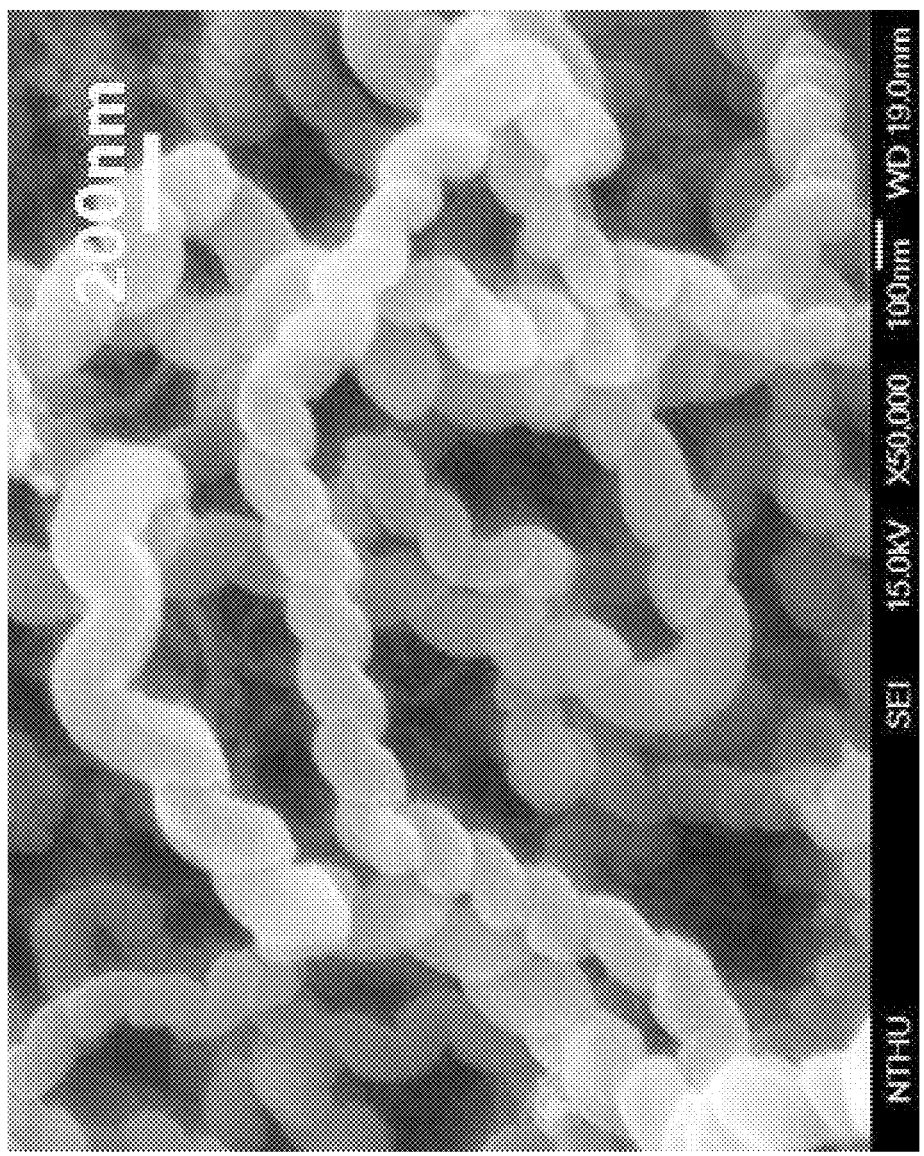
FIG. 14 is a scanning electron microscope (SEM) image of a coiled nano carbon material morphology according to the first embodiment of the present disclosure.
Figure 15:
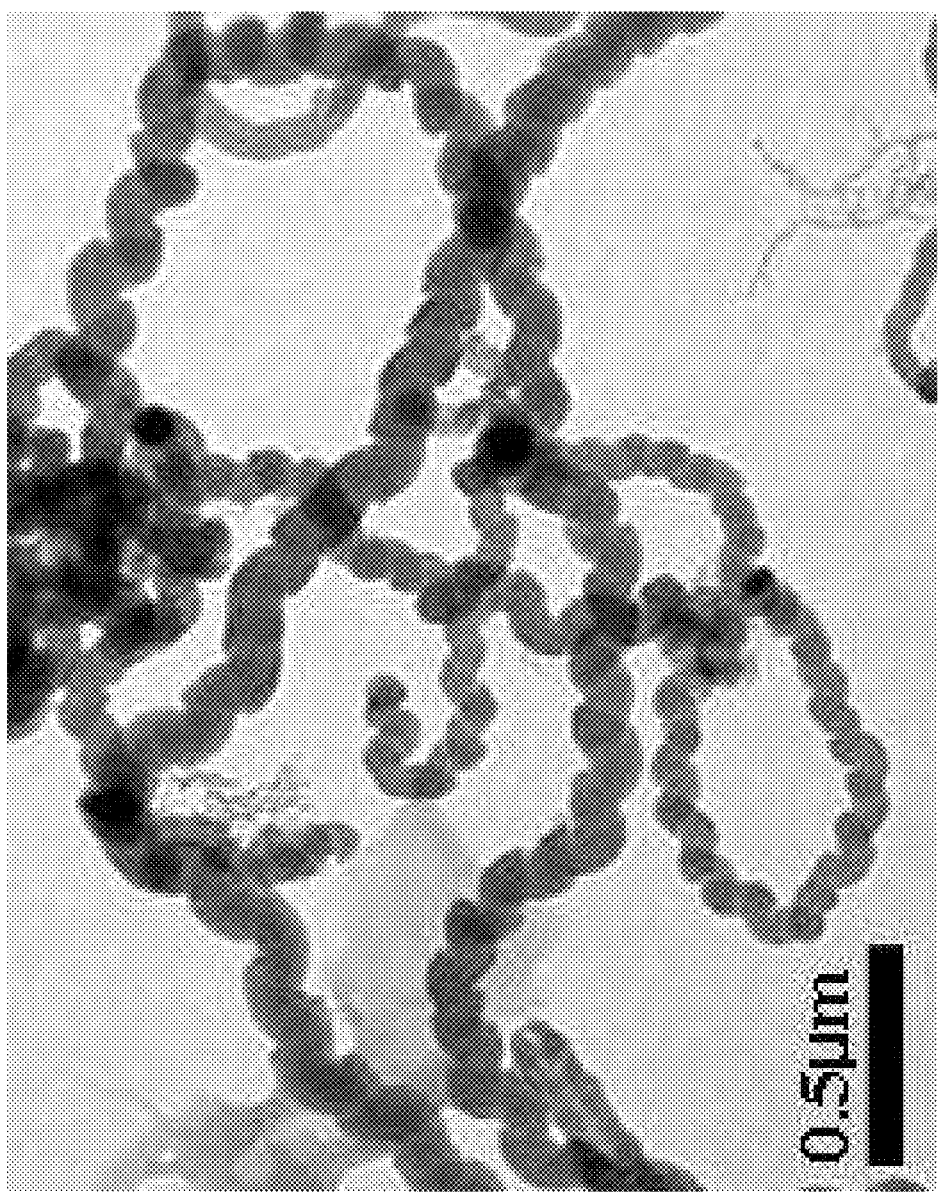
FIG. 15 is a transmission electron microscope (TEM) image of a twist-shaped coiled carbon nano tube according to the first embodiment of the present disclosure.
Figure 16:
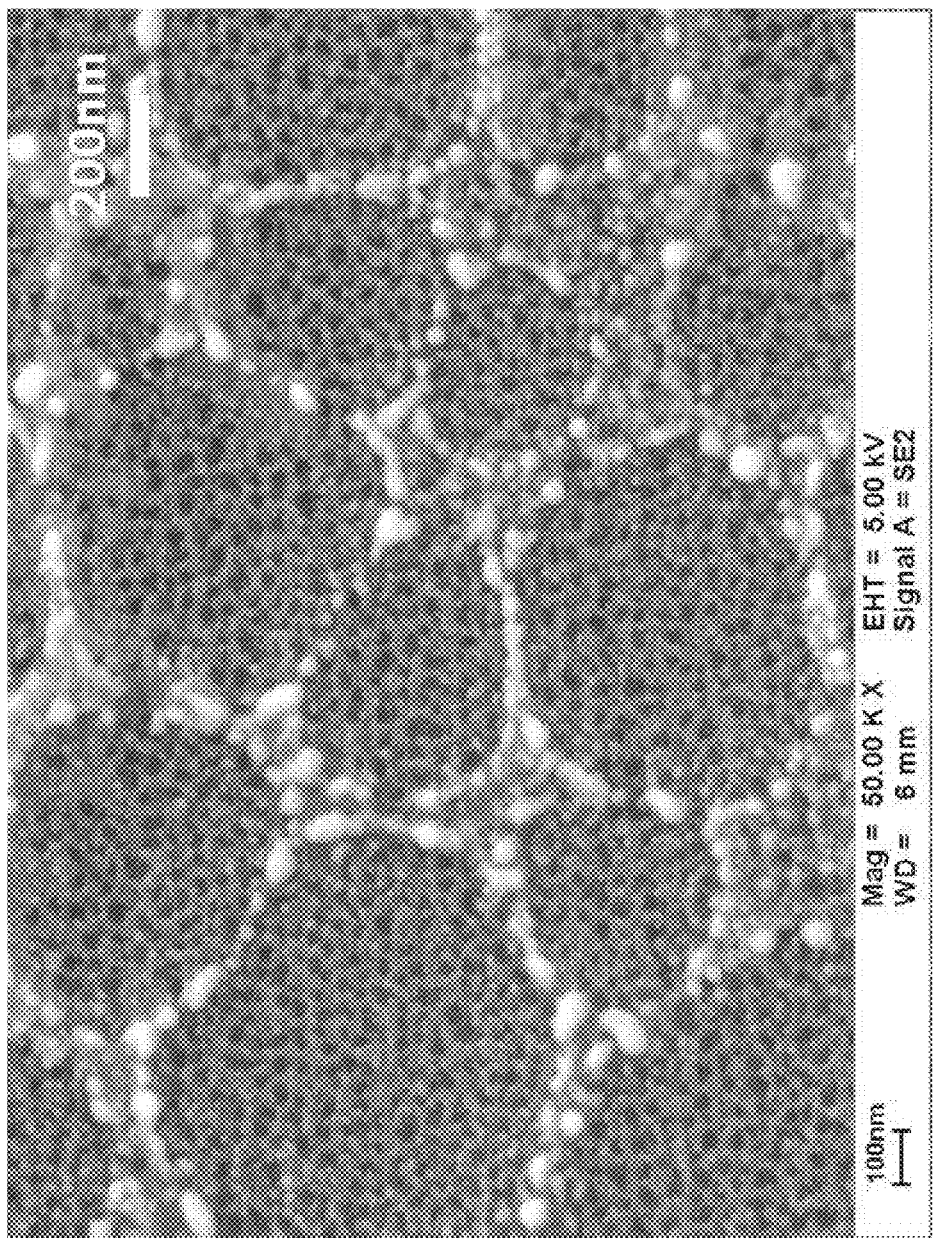
FIG. 16 is a scanning electron microscope (SEM) image of noble metal catalyst crystallite nucleus layer according to the second embodiment of the present disclosure.
Figure 17:
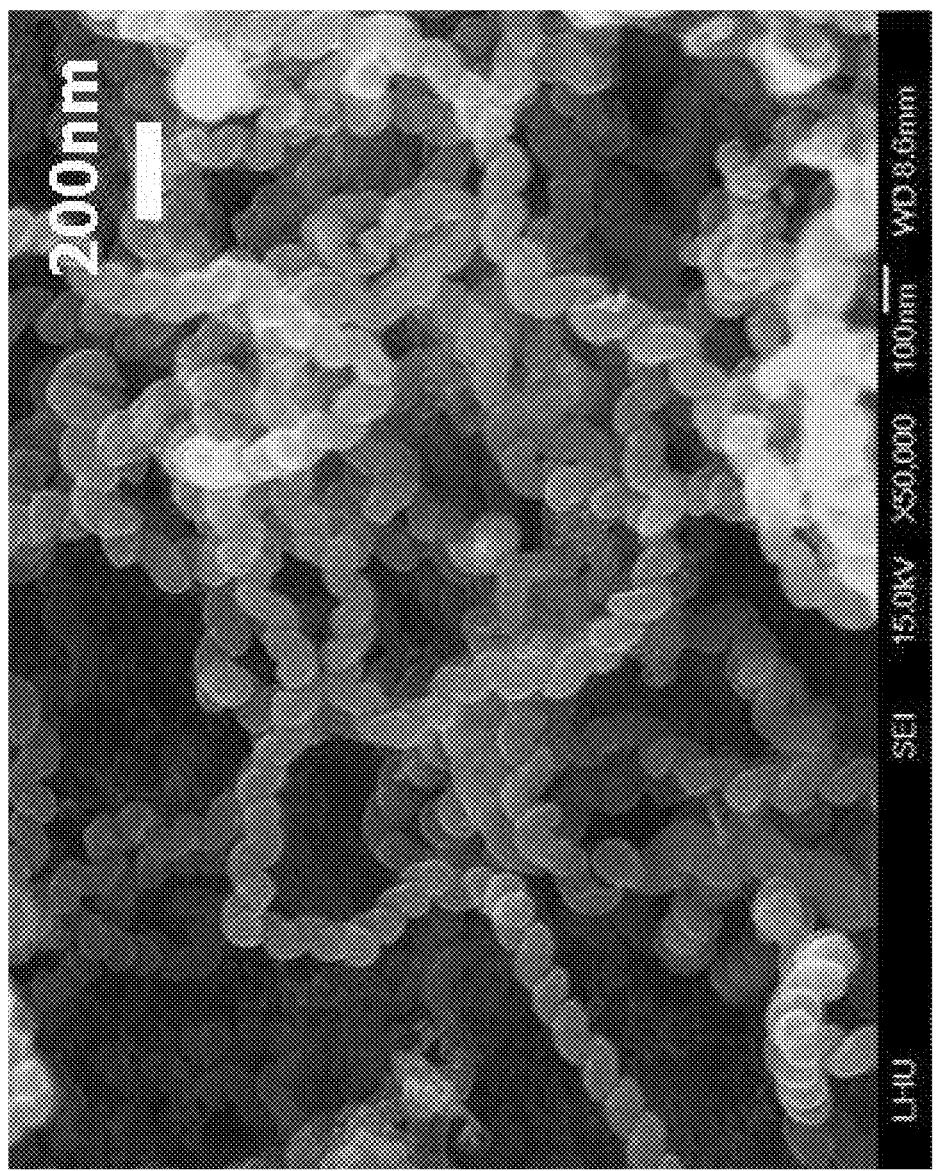
FIG. 17 is a scanning electron microscope (SEM) image of a coiled nano carbon material morphology according to the second embodiment of the present disclosure.
Figure 18:
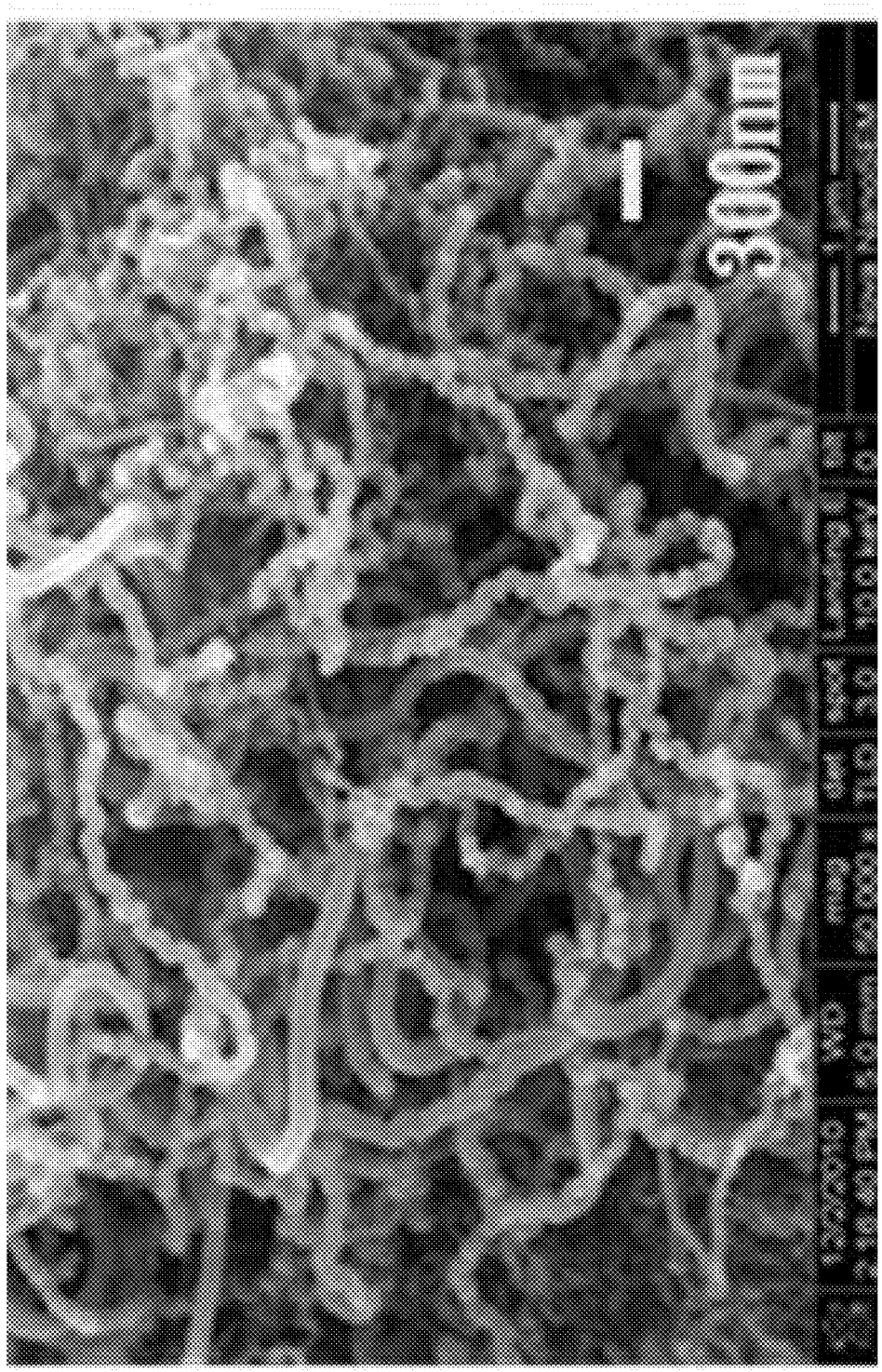
FIG. 18 is a transmission electron microscope (TEM) image of a coiled nano carbon material morphology according to the third embodiment of the present disclosure.
Figure 19:
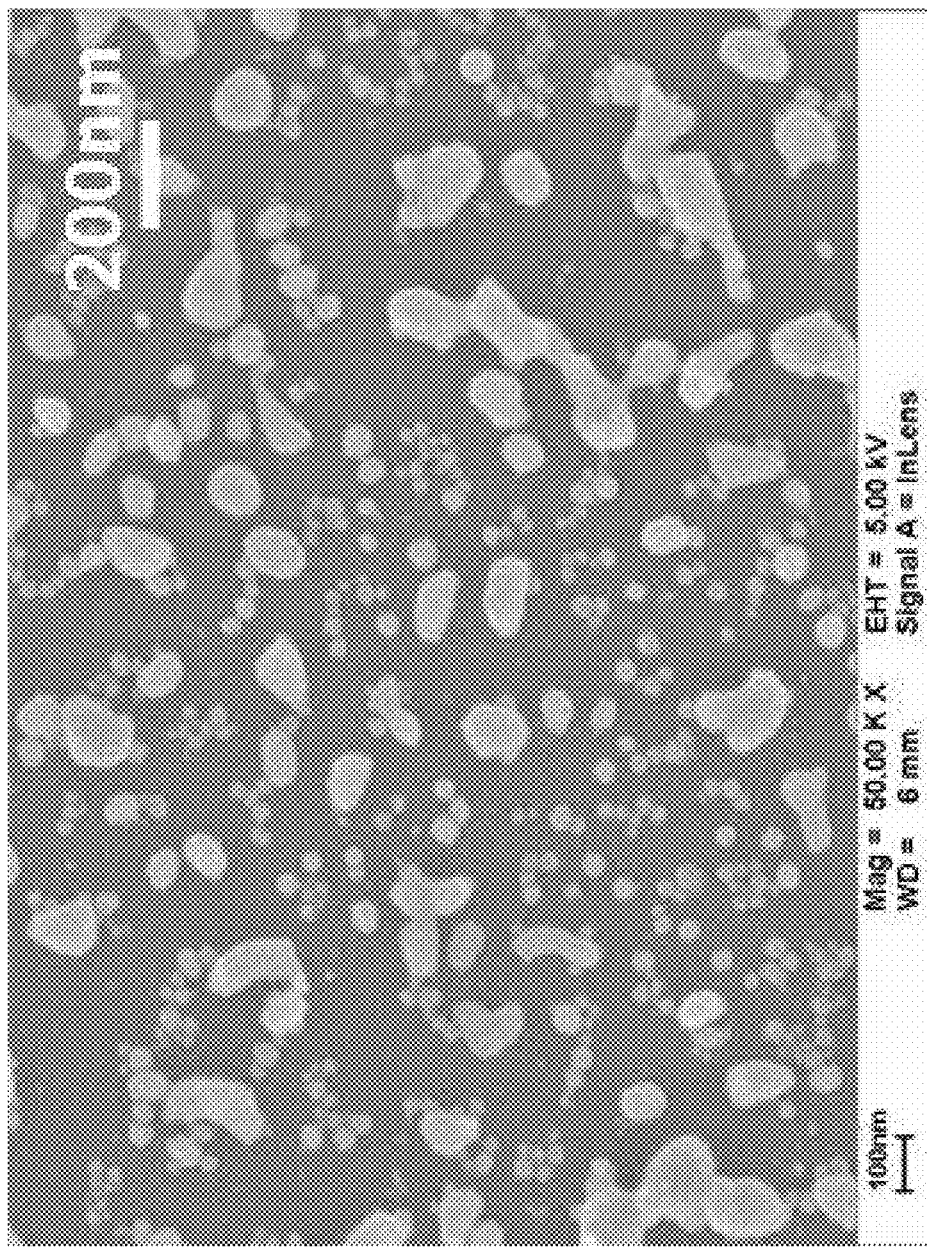
FIG. 19 is a scanning electron microscope (SEM) image of noble metal catalyst crystallite nucleus layer according to the fourth embodiment of the present disclosure.
Figure 20:
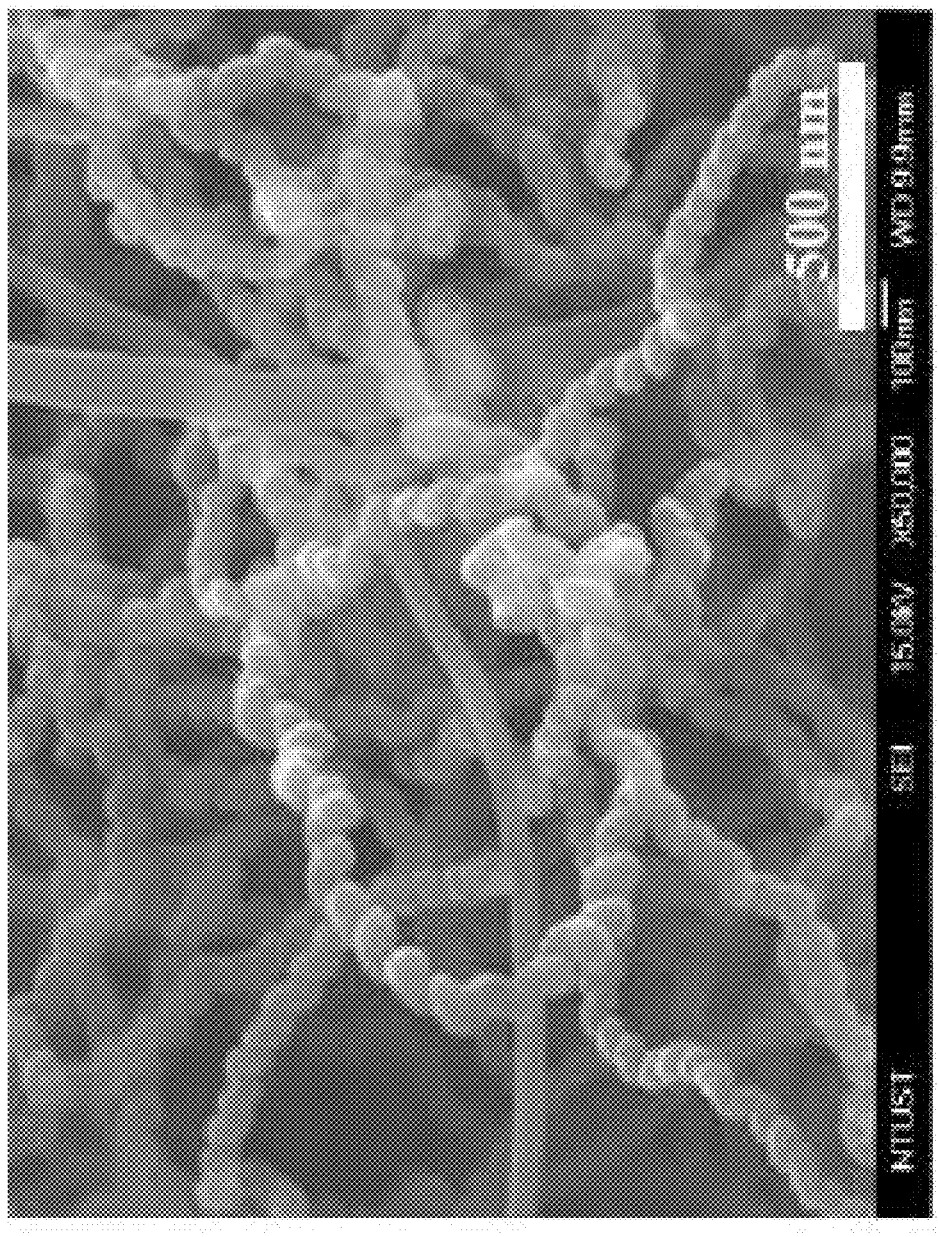
FIG. 20 is a scanning electron microscope (SEM) image of a coiled nano carbon material morphology according to the fourth embodiment of the present disclosure.
Figure 21:
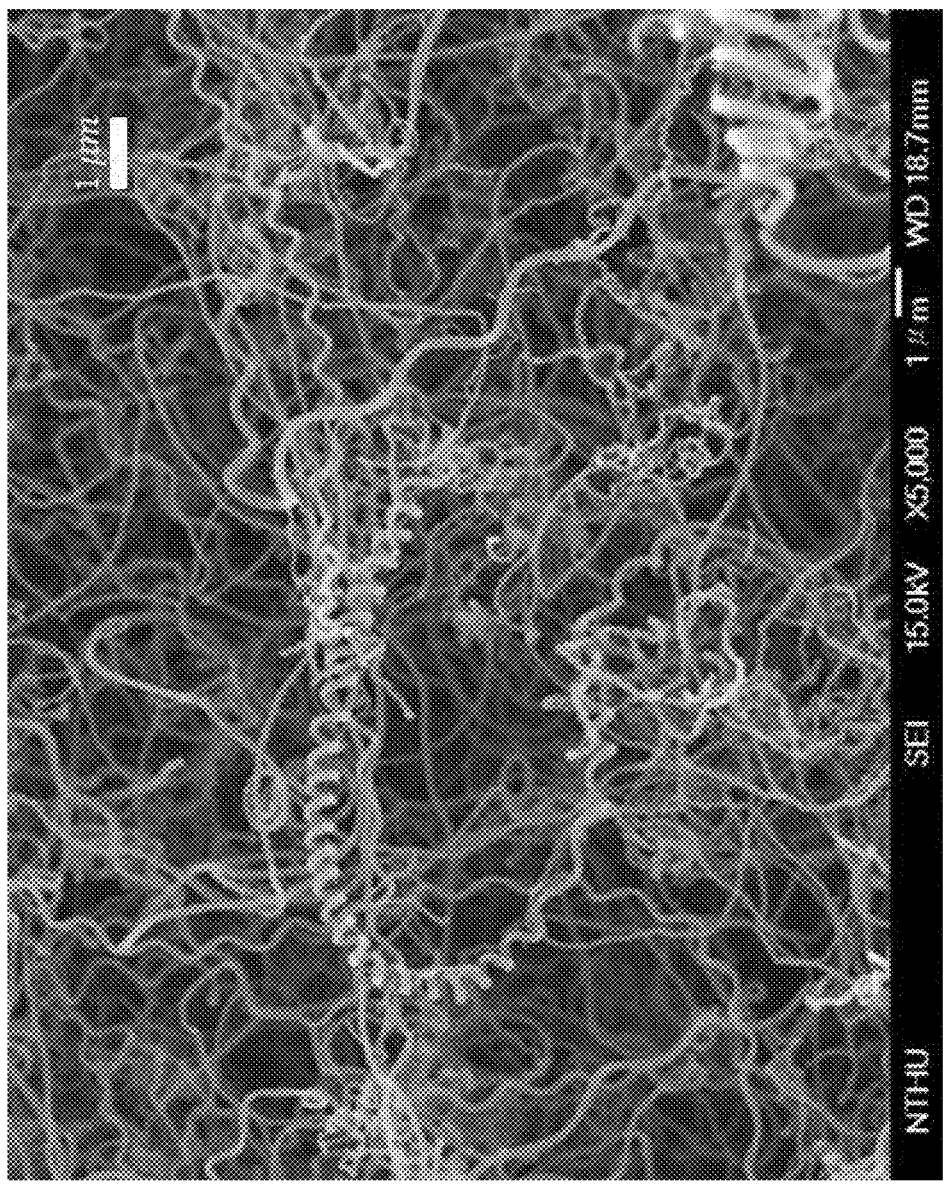
FIG. 21 is a scanning electron microscope (SEM) image of a coiled nano carbon material morphology according to the fifth embodiment of the present disclosure.
Figure 22:
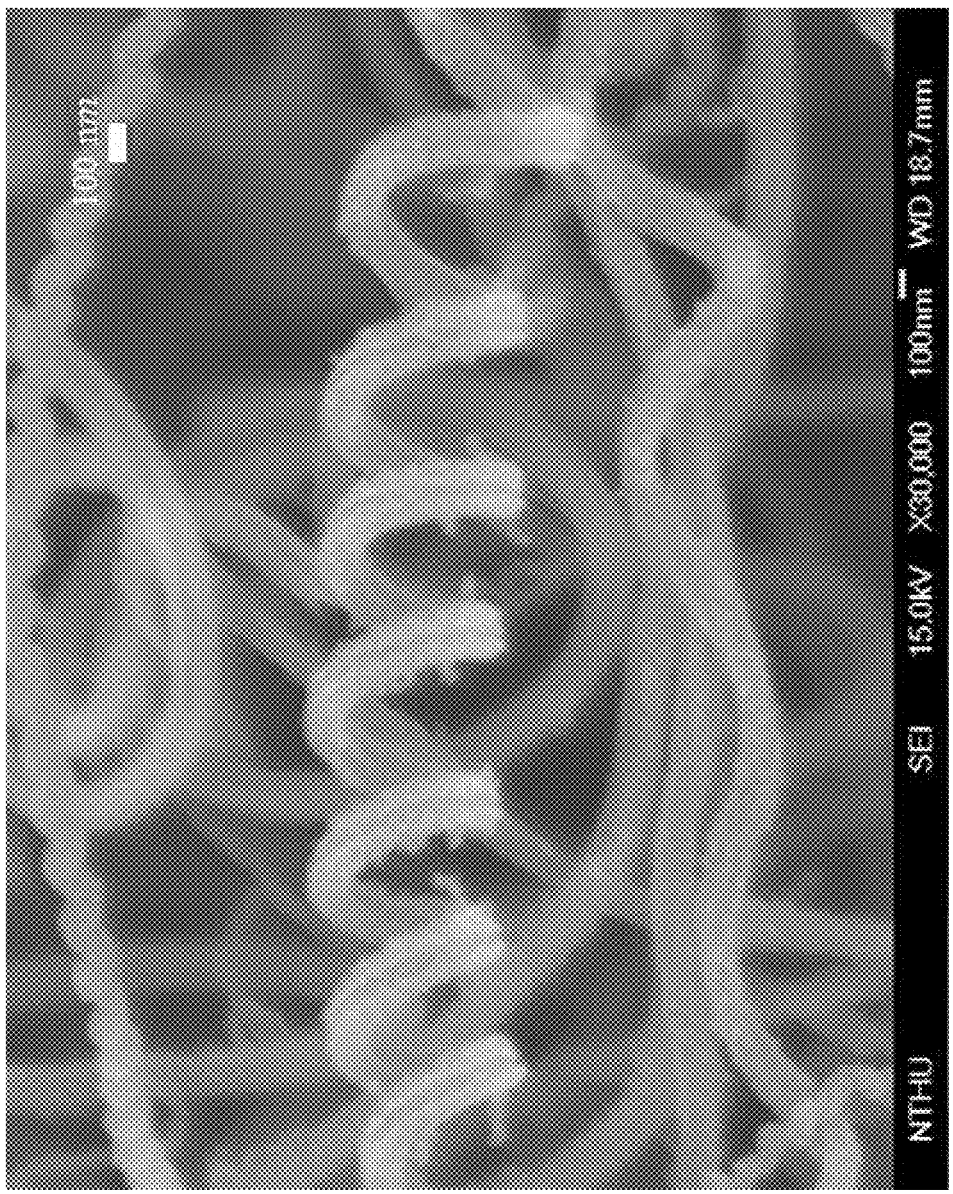
FIG. 22 is an enlarged scanning electron microscope (SEM) image of a coiled nano carbon material morphology according to the fifth embodiment of the present disclosure.
Figure 23:
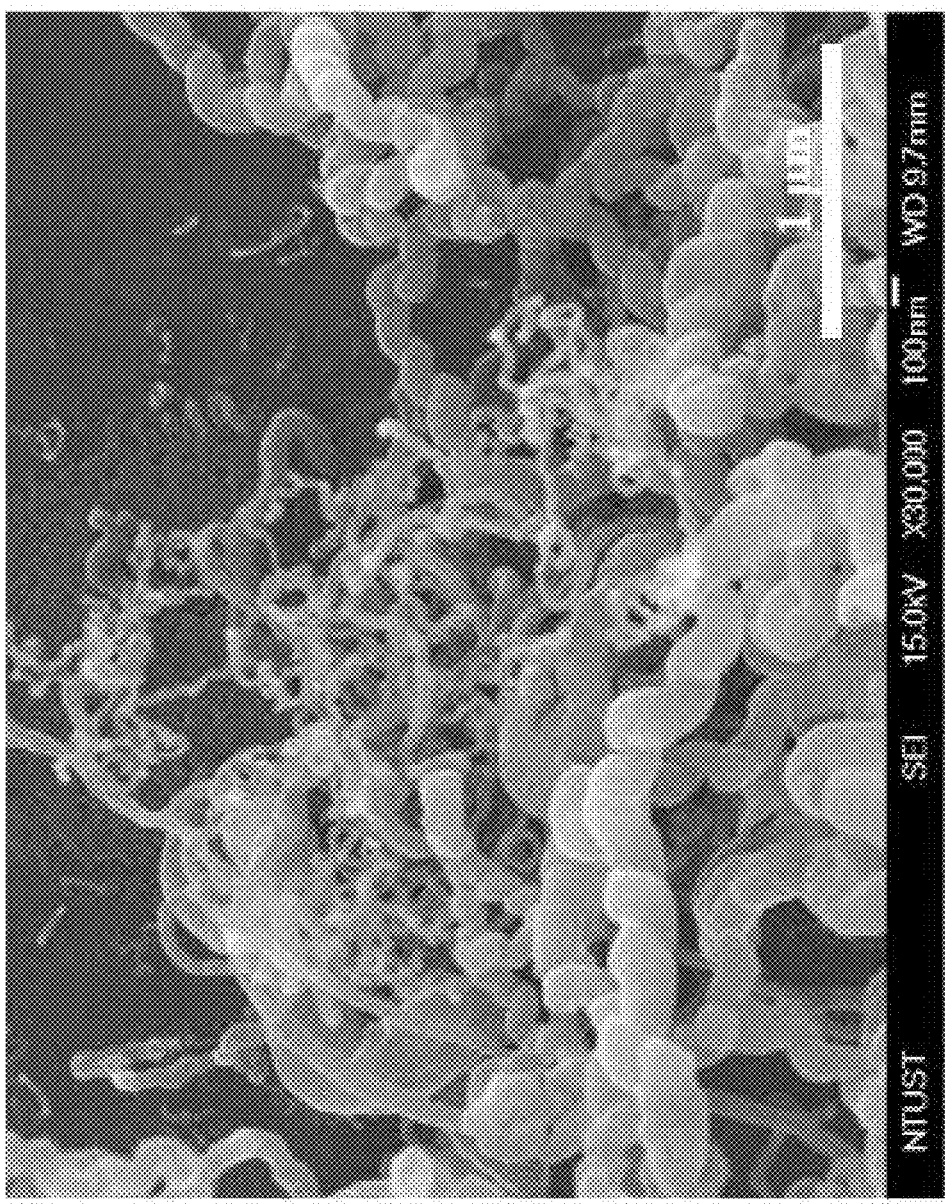
FIG. 23 is a scanning electron microscope (SEM) image of a coiled nano carbon material morphology according to the sixth embodiment of the present disclosure.

| | embodiment | | | | | |
|---|---|---|---|---|---|---|
| | 1st | 2nd | 3rd | 4th | 5th | 6th |
| steps | S1~S5 | S1~S5 | S1~S5 | SS1~SS5 | SS1~SS5 | S1~S5 |
| substrate | Silicon wafer | alumina | iron-cobalt-nickel alloy (#304 stainless steel) | silicon | iron-cobalt-nickel alloy (#304 stainless steel) | silicon |
| Noble metal catalyst | Pd(styrenea-co-NIPAAmb) The noble metal catalyst crystallite nucleus layer is shown in FIG. 4. | Pd(styrenea-co-NIPAAmb) The noble metal catalyst crystallite nucleus layer is shown in FIG. 16. | Pd(styrenea-co-NIPAAmb) | $PdCl_2$ The noble metal catalyst crystallite nucleus layer is shown in FIG. 18. | $PdCl_2$ | Co-catalyst formed of $PdCl_2$ and Ni—P |
| Degree of Initial vacuum | $10^{-2}$ torr | $10^{-2}$ torr | $10^{-2}$ torr | $10^{-2}$ torr | $10^{-2}$ torr | $10^{-2}$ torr |
| Inert gas | Ar, $H_2$ | Ar, $H_2$ | Ar, $H_2$ | Ar, $H_2$ | Ar, $H_2$ | Ar, $H_2$ |
| Carbon source gas | $C_2H_2$ | $C_2H_2$ | $C_2H_2$ | $C_2H_2$ | $C_2H_2$ | $C_2H_2$ |
| Growth temperature $T_k$ | 600□ | 700□ | 600□ | 600□ | 700□ | 600□ |
| Growing time | 20 Min. | 20 Min. | 30 Min. | 20 Min. | 10 Min. | 20 Min. |
| Measured quantity of the coiled nano carbon material | 90% | 90% | 70% | 80% | 60% | 30% |
| SEM image | FIG. 13 FIG. 14 | FIG. 17 | — | FIG. 20 | FIG. 21 FIG. 22 | FIG. 23 |
| TEM image | FIG. 15 | — | FIG. 18 | — | — | — |
| Aging temperatue Tc | No step S6 | No step S6 | Step S6 300□ | No step SS6 | Step SS6 450□ | Step SS6 300□ |
| Measured quantity of the coiled nano carbon material after aging | — | — | 76% | — | 69% | 34% |

According to the third embodiment, by processing with the aging step in step S6, the substrate 10 having the composited nano carbon material layer 20 formed by step S1~S5 is disposed in the atmosphere chamber with nitrogen gas introduced thereinto. Then, the atmosphere chamber is heated to the aging temperature Tc of 300° C., the measured quantity of the coiled nano carbon material 21 is increased to 76%. According to the fifth embodiment, by processing with the aging step in step SS6, the substrate 10 having the composited nano carbon material layer 20 formed by step SS1~SS5 is disposed in the atmosphere chamber with nitrogen gas introduced thereinto. Then, the atmosphere chamber is heated to the aging temperature Tc of 450° C., and the measured quantity of the coiled nano carbon material 21 is increased to 69%. According to the sixth embodiments, by processing with the aging step in step S6, the substrate 10 having the composited nano carbon material layer 20 formed by step S1~S5 is disposed in the atmosphere chamber with argon gas introduced thereinto. Then, the atmosphere chamber is heated to the aging temperature Tc of 300° C., and the measured quantity of the coiled nano carbon material 21 is increased to 34%.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present disclosure cover modifications and variations of this invention provided they fall within the scope of the following claims.

What is claimed is:

1. A method for fabricating coiled nano carbon material, comprising:

providing a substrate, and cleaning the surface of said substrate;

immersing the substrate in a noble metal catalyst solution which contains a noble metal catalyst, thereby forming a noble metal catalyst crystallite nucleus layer on the surface of the substrate, wherein the noble metal catalyst is selected from the group consisting of a first catalyst group, a second catalyst group, and combinations thereof;

wherein the first catalyst group is selected from an organic chelate chelated with platinum, palladium, rhodium, chrome, ruthenium, osmium, or iridium, and mixtures thereof;

wherein the second catalyst group is selected from a solution of chloride, sulfate, acetate, and mixtures thereof comprising one selected from platinum, palladium, rhodium, chrome, ruthenium, osmium, iridium, and mixtures thereof;

drying the substrate having the noble metal catalyst crystalline nucleus layer;

disposing the substrate having the noble metal catalyst crystallite nucleus layer formed thereon in a vacuum chamber;

performing a thermal chemical deposition (TCVD) process introducing an inert gas and a carbon source gas into the chamber with a initial vacuum, heating the chamber to a predetermined growth temperature, and growing a composited nano carbon material layer on the substrate with a predetermined growing time;

wherein the organic chelate is "A" (copolymer of styrene monomer and N-isopropylacrylamide monomer (Poly (Styrenea-Co-NIPAAmb)), "B" (copolymer of styrene monomer and polyester oligomer), "C" (copolymer of styrene monomer and methyl methacrylate (PS-co-PMMA[poly(styrene-co-methyl methacrylate)])), "D" (ethylene vinyl acetate copolymer), "E" (copolymer of polyvinyl acetate and chitosan (poly(vinyl acetate) chitosan(CS)-graft-poly(vinyl acetate)), or combinations thereof;

wherein the composited nano carbon material layer comprises the coiled nano carbon material, and the coiled nano carbon material is a mixture containing a coiled nano carbon tube and a coiled nano carbon fiber; wherein the amorphous matrix of said coiled nano carbon fiber has crystallized carbon nanoparticles;

where the average measured quantity of the coiled nano carbon material in the composited nano carbon material layer is at least 30%.

2. The method according to claim 1, wherein the carbon source gas is acetylene, methane, or combinations thereof, and the inert gas is hydrogen, argon, helium, or combinations thereof.

3. The method according to claim 1, wherein the substrate is made of silicon, glass, alumina ceramic, indium tin oxide, metal, or combinations thereof, and the noble metal catalyst is selected from the first catalyst group.

4. The method according to claim 3, wherein a degree of the initial vacuum is higher than 0.1 torr, the predetermined growth temperature is 500° C.~900° C., and the predetermined growing time is 5 min~60 min.

5. The method according to claim 1, further comprising:

disposing the substrate having the composited nano carbon material layer in an atmosphere chamber, and heating the atmosphere chamber with introducing an inert gas to an aging temperature in order to proceed on an aging step;

wherein the aging temperature is above 200° C., and the average measured quantity of the coiled nano carbon material in the composited nano carbon material layer is at least 33%.

6. The method according to claim 1, wherein the substrate is made of iron-nickel alloy, iron-cobalt-nickel alloy, nickel, nickel-copper, copper, copper alloy, nickel electroplated silicon, nickel-doped silicon, nickel electroplated glass, nickel-doped glass, nickel electroplated alumina ceramic, nickel doped alumina ceramic, and the combinations thereof, and the noble metal catalyst is content of the second catalyst group.

7. The method according to claim 6, wherein a degree of the initial vacuum is higher than 0.1 torr, the predetermined growth temperature is 550° C.~900° C., and the predetermined growing time is 5 min~60 min.

8. The method according to claim 7, further comprising:

disposing the substrate having the composited nano carbon material layer in an chamber, and heating the chamber with introducing a inert gas to an aging temperature in order to proceed on an aging process;

wherein the aging temperature is above 200° C., and the average measured quantity of the coiled nano carbon material in the composited nano carbon material layer is at least 55%.

* * * * *